United States Patent [19]

Miyagawa et al.

[11] Patent Number: 5,359,175
[45] Date of Patent: Oct. 25, 1994

[54] LASER MACHINING SYSTEM

[75] Inventors: Naoomi Miyagawa, Gifu; Minoru Tashiro, Kani; Kazuyuki Toda, Aichi; Yukiyasu Nakamura, Inazawa, all of Japan

[73] Assignee: Kiwa Giken Kabushiki Kaisha, Japan

[21] Appl. No.: 857,600

[22] Filed: Mar. 31, 1992

[30] Foreign Application Priority Data

Apr. 3, 1991 [JP] Japan .................................. 3-096105
Apr. 30, 1991 [JP] Japan .................................. 3-124452

[51] Int. Cl.⁵ .............................................. B23K 26/02
[52] U.S. Cl. ......................... 219/121.82; 219/121.67; 219/121.63
[58] Field of Search ..................... 219/121.63, 121.64, 219/121.72, 121.67, 121.82, 121.79, 121.78, 121.83

[56] References Cited

U.S. PATENT DOCUMENTS 5,192,848  3/1993  Miyakawa et al. ............ 219/121.82

FOREIGN PATENT DOCUMENTS 165871   12/1985  European Pat. Off. .
58-93528  6/1983  Japan .
60-247422 12/1985  Japan .
3-196947  8/1991  Japan .

OTHER PUBLICATIONS

English language Abstract of 3-196947.
English language Abstract of 58-93528.
English language Abstract of 247,422.
English language Abstract of 165,871.

Primary Examiner—C. L. Albritton
Attorney, Agent, or Firm—Beveridge, DeGrandi, Weilacher & Young

[57] ABSTRACT

Laser machining system including a laser machine, a stack yard for storing pallets, a stacker crane for transferring pallets. Standard pallets and multi-pallets are stored in the stack yard. The standard pallet has a pallet base and plates are piled on the pallet base directly. The multi-pallet comprises a pallet base and pallet components stacked on the pallet base. Each pallet has pallet components which each store a single plate. A transfer device is provided for loading a blank plate (pre-worked plate) to the laser machine and unloading a post-worked plate from the laser machine. Returning devices are provided for returning post-worked plates to the stack yard.

26 Claims, 37 Drawing Sheets

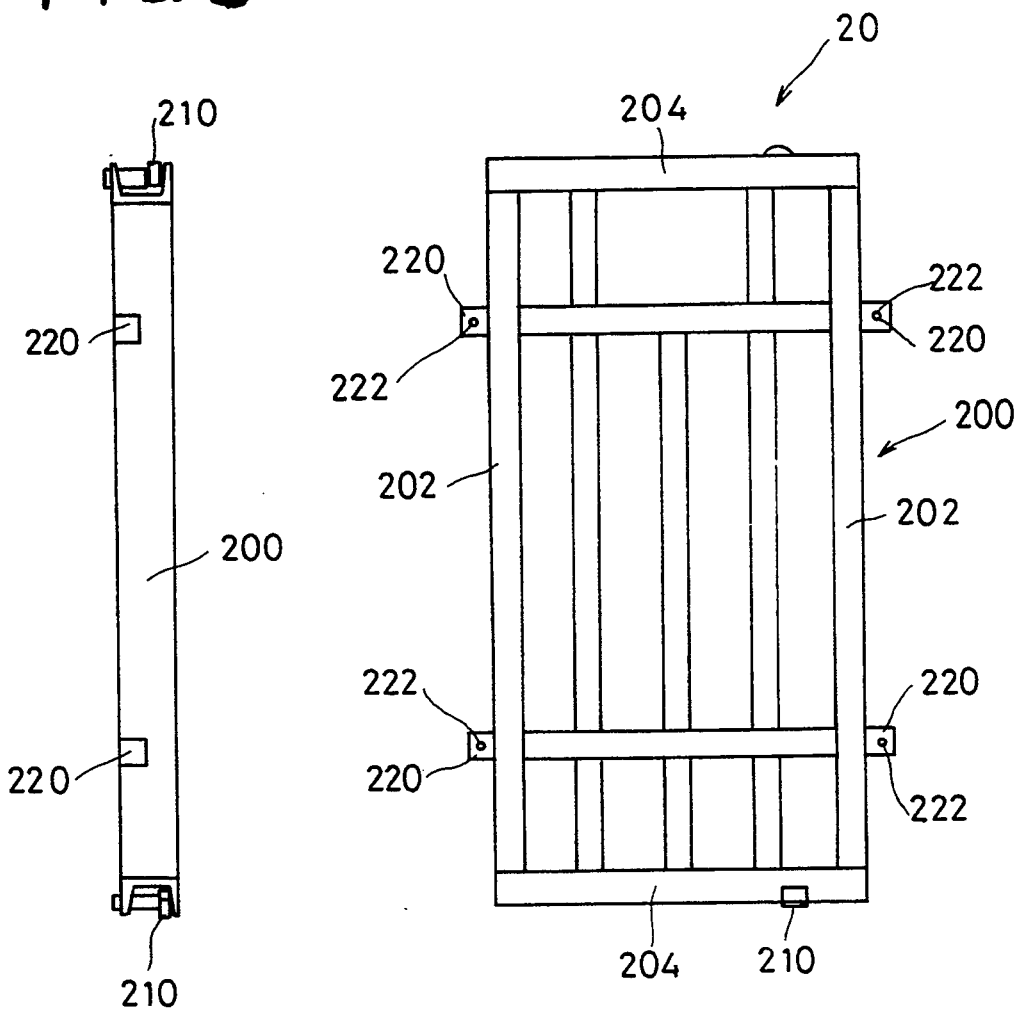
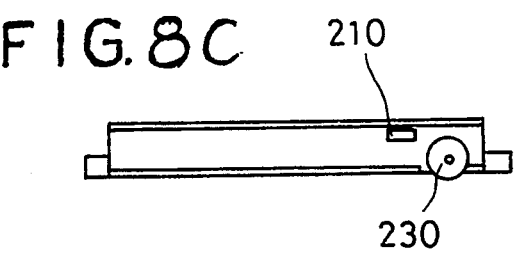

FIG. 34A
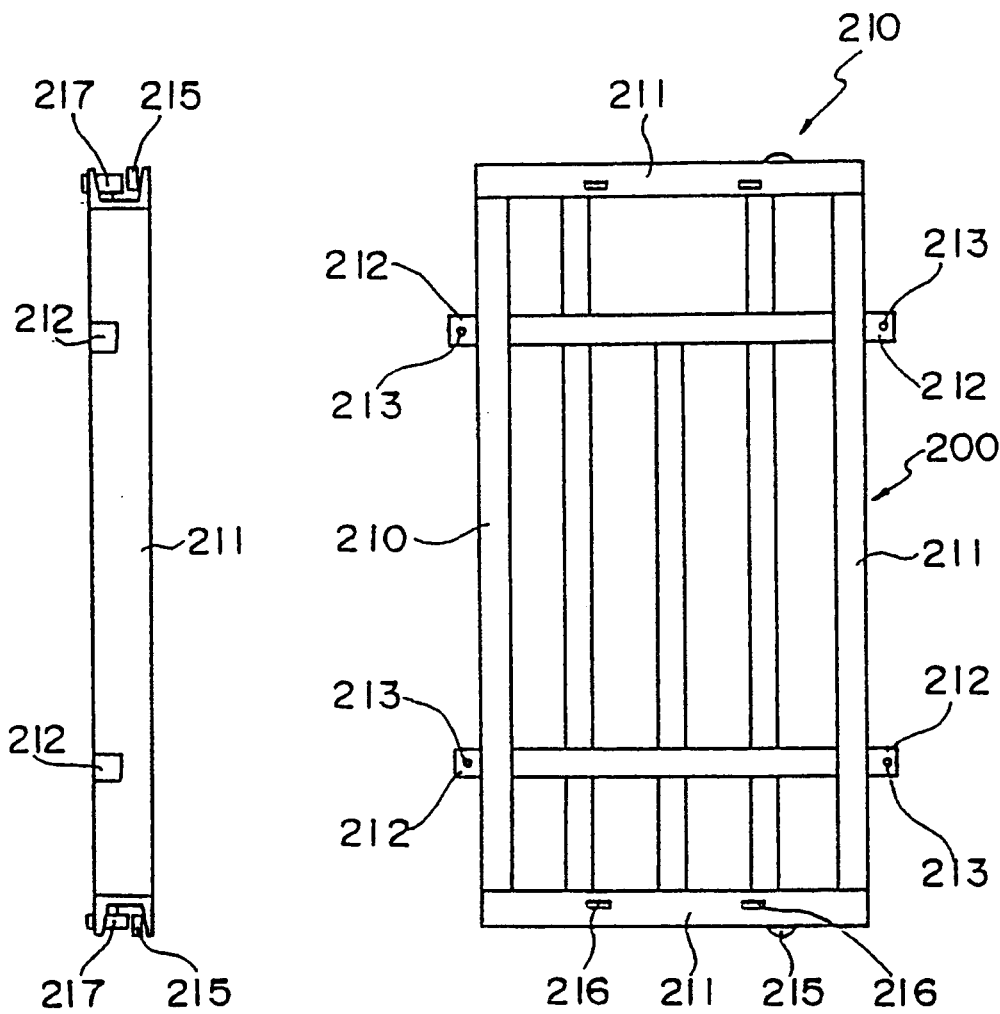
FIG. 34B
FIG. 34C
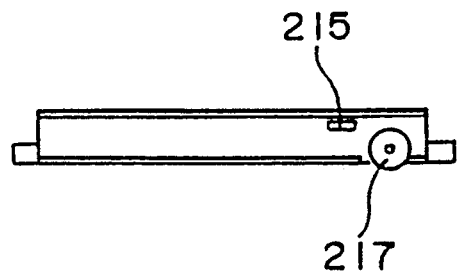

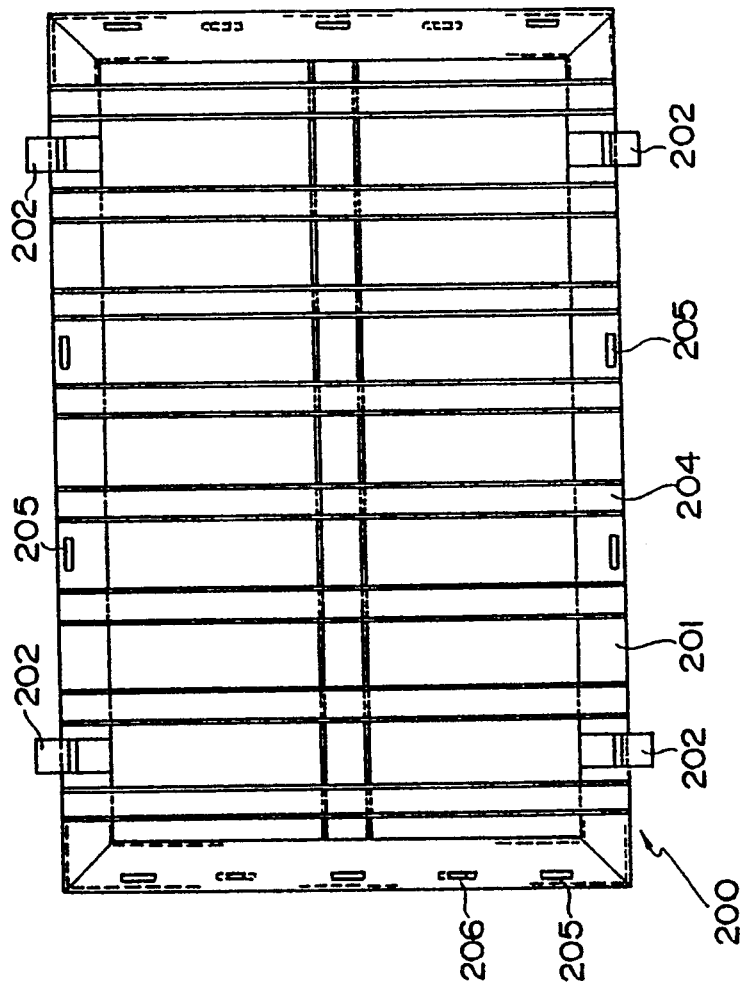
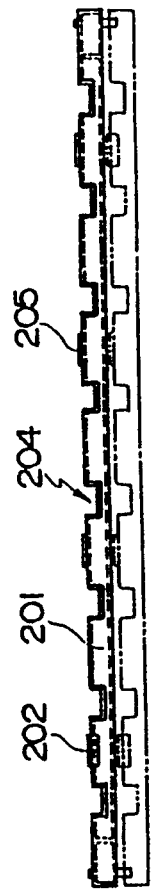
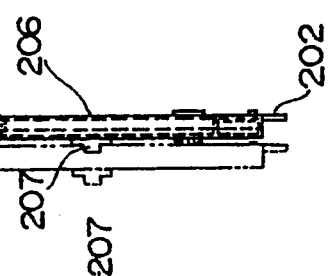
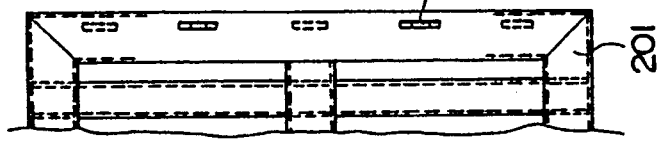
FIG. 35A
FIG. 35B
FIG. 35C
FIG. 35D

LASER MACHINING SYSTEM

FIELD OF THE INVENTION

This invention relates to a laser machining system equipped with a laser machine and a work transfer device.

BACKGROUND OF THE INVENTION

A laser machining cell aiming at automatic laser machining by equipping a laser machine and a work transfer device has been put to practical use.

A laser machining system which adds to this laser machining cell, a stacker crane for transferring pallets with work loaded, and a stack yard for storing the pallets could maintain the automatic machining for a long period of time and its productivity is quite high.

In this type of system, the blank work-piece of the loading station is provided to the laser machine by the work-piece transfer device. Following machining, is the work-piece transferred by the work-piece transfer device to the unloading station provided on the opposite side of the loading station to the laser machine.

The machined workpiece is sent to the unloading station, and is parted by the operator on the unloading station.

Because the machining is done automatically, this sorting operation has to be done each time the work is sent to the unloading station. Otherwise, unsorted work is piled on the unloading station making it necessary to stop the laser machining. Therefore, it becomes difficult to carry on the automatic manufacturing. Japanese laid-open patent application Showa 60-247422, Japanese utility model publication Heisei 3-47701 and Japanese laid-open utility model application Heisei 3--36328 disclose metal plate machining system which includes a metal plate machine like a punching press or a shearing machine, a stack yard, and a stacker crane.

Japanese laid-open patent application Heisei 3-196947 discloses a plate machining system including a stacker crane which transfers blank plate to more convenient stack in a stack yard during idle time.

Japanese laid-open patent application Showa 58-93528 discloses a transfer press system including a conveyer which transfers a pallet with blank plates thereon from a stacker crane press machine.

In these systems, a plate worked by a machine (post-worked plate) is always unloaded.

In some case, a remaining part of a post-worked plate can be used again as a pre-worked plate for a future machining.

In a laser machining system including a returning device which returns a post-worked plate to a stack yard, the post-worked plate can be recycled to improve productivity. And, by returning post-worked plate to the stack yard automatically, prolonged, uninterrupted automatic operation can be achieved.

DISCLOSURE OF THE INVENTION

One of the objects of the invention is to provide a laser machining system including returning devices which transfer a post-worked plate to a stack yard.

The laser machining system of the present invention is equipped with a stack yard for storing pallets and a stacker crane for transferring pallets to the laser machining cell. The laser machining cell is equipped with a laser machine, a loading station for placing works (pre-worked plates) supplied to the laser machine, a first unloading station for receiving the work with laser machining done provided on the loading station side of the laser machine, a second unloading station for receiving the work with laser machining done (post-worked plates) provided on the opposite side of the loading station to the laser machine and a work transfer device for transferring work between the loading station and the second unloading station.

The first unloading station is composed of a carrier which receives the work from the work transfer device and runs along the axis which crosses orthogonally with the moving axis of the work transfer device, a work clamp for holding the work transferred by the carrier, a lifter which holds the work and runs along the axis which is parallel to the moving axis of the work transfer device and a pallet stand which holds pallets.

The works with laser machining finished or half-finished products with only a part of the machining done (post-worked plates) are sent to the first unloading station and stored in the stack yard piled on the pallet. Therefore, automatic manufacturing could be continued without stopping the machining of the laser machine.

The other object of the invention is to provide a laser machining system in which a multi-pallet device is used for recycling a remaining plate (post-worked plate) as a blank plate in the next machining.

BRIEF EXPLANATION OF THE DRAWINGS

FIGS. 8A–C show plan, front and side view of the pallet;

FIG. 34A–C show plan, front and side views of

FIG. 35A–D show plan, front, side and detail views of

DETAILED DESCRIPTION OF THE PREFERRED EMBODIMENT

Figure 1:
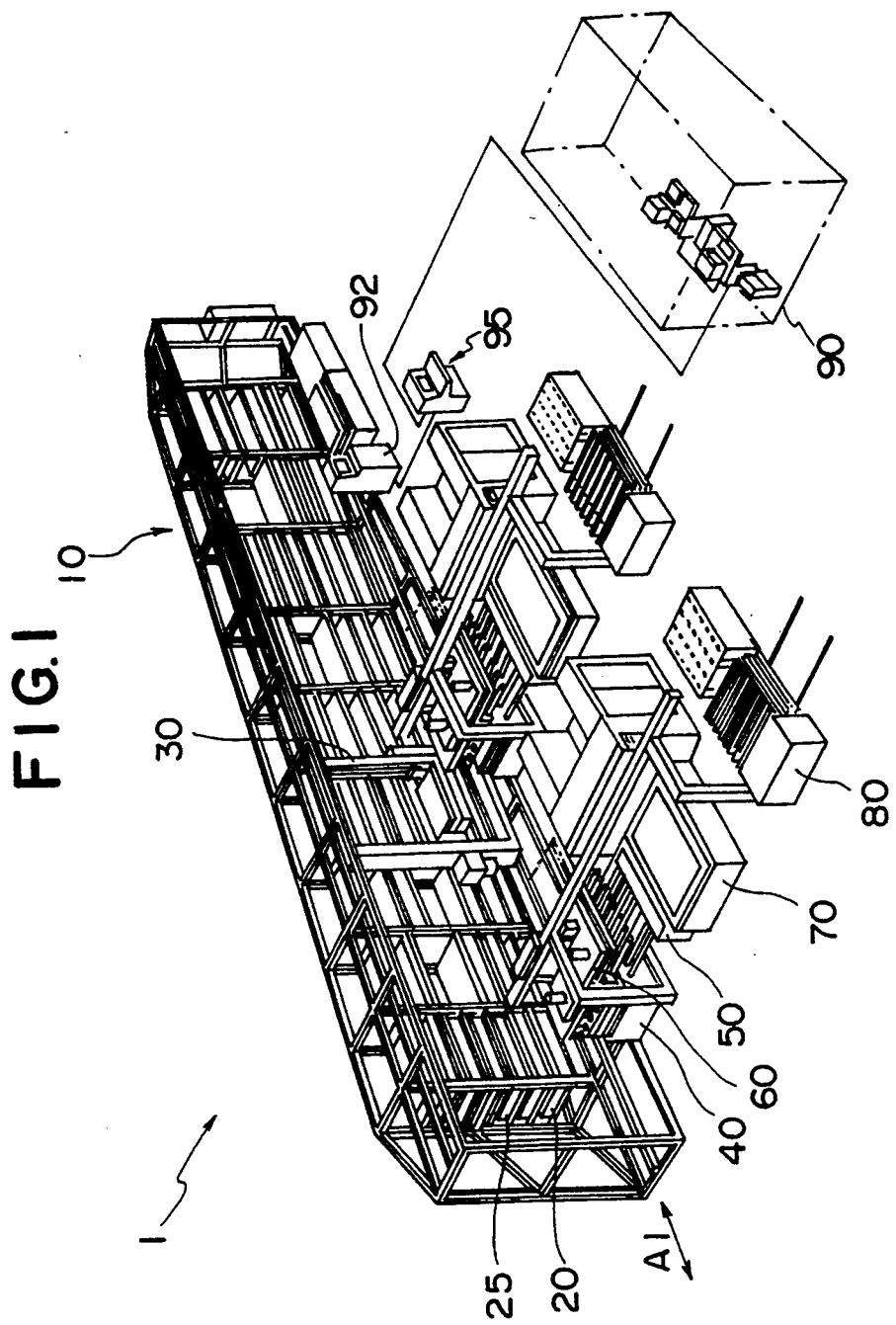
FIG. 1 is a perspective view of an embodiment of the present invention.

FIG. 1 is a perspective view showing an outline of the laser machining system of the present invention.

The present manufacturing system 1 comprises a stack yard 10 and a pallet 20 stacked inside the stack yard 10. A stacker crane 30 is equipped facing the stack yard 10. A plurality of laser machining cells are located on the front side of the stack yard 10. In FIG. 1, two laser machining cells are shown.

The laser machining cell is equipped with a loading station 40 of the work, a first unloading station 50, a transferring device 60 for the work, a laser machine 70 and a second unloading station 80.

A work 25 being the object of the laser machining is a metal plate which is stored piled on top of the pallet 20. The stacker crane 30 draws out the work from the stack yard 10 along with the pallet and transfers it to the loading station 40 of the laser machining cell.

The work transferred to the loading station 40 is supplied to the laser machine 70 by the work transfer device 60. When the necessary machining is finished by the laser machine 70, the work is carried to the first unloading station 50 or the second unloading station 80 by the work transfer device 60.

This series of movement of the devices is controlled by the line controller 95.

Figure 2:
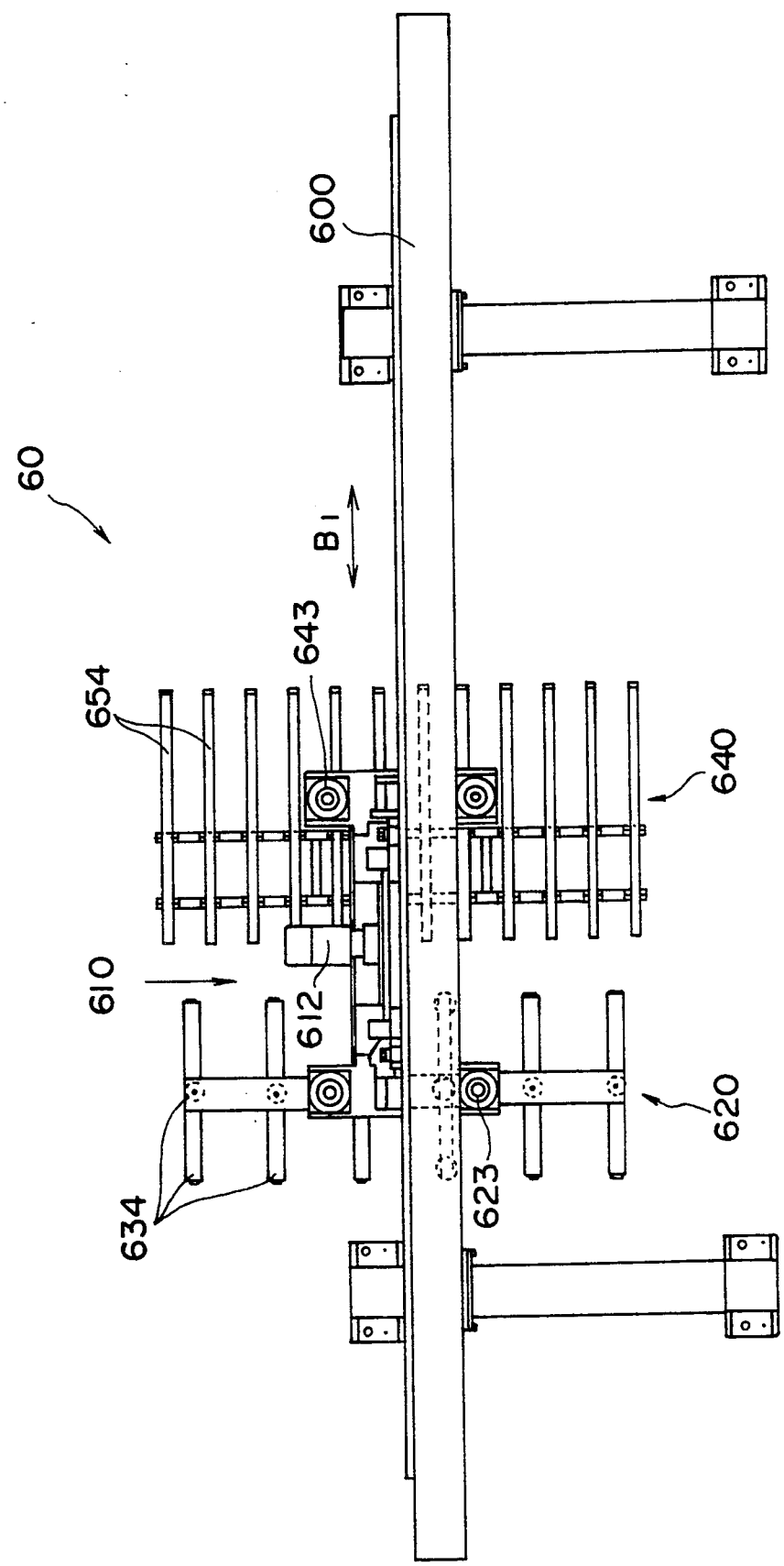
FIG. 2 is a plan view of the work transfer device.
Figure 3:
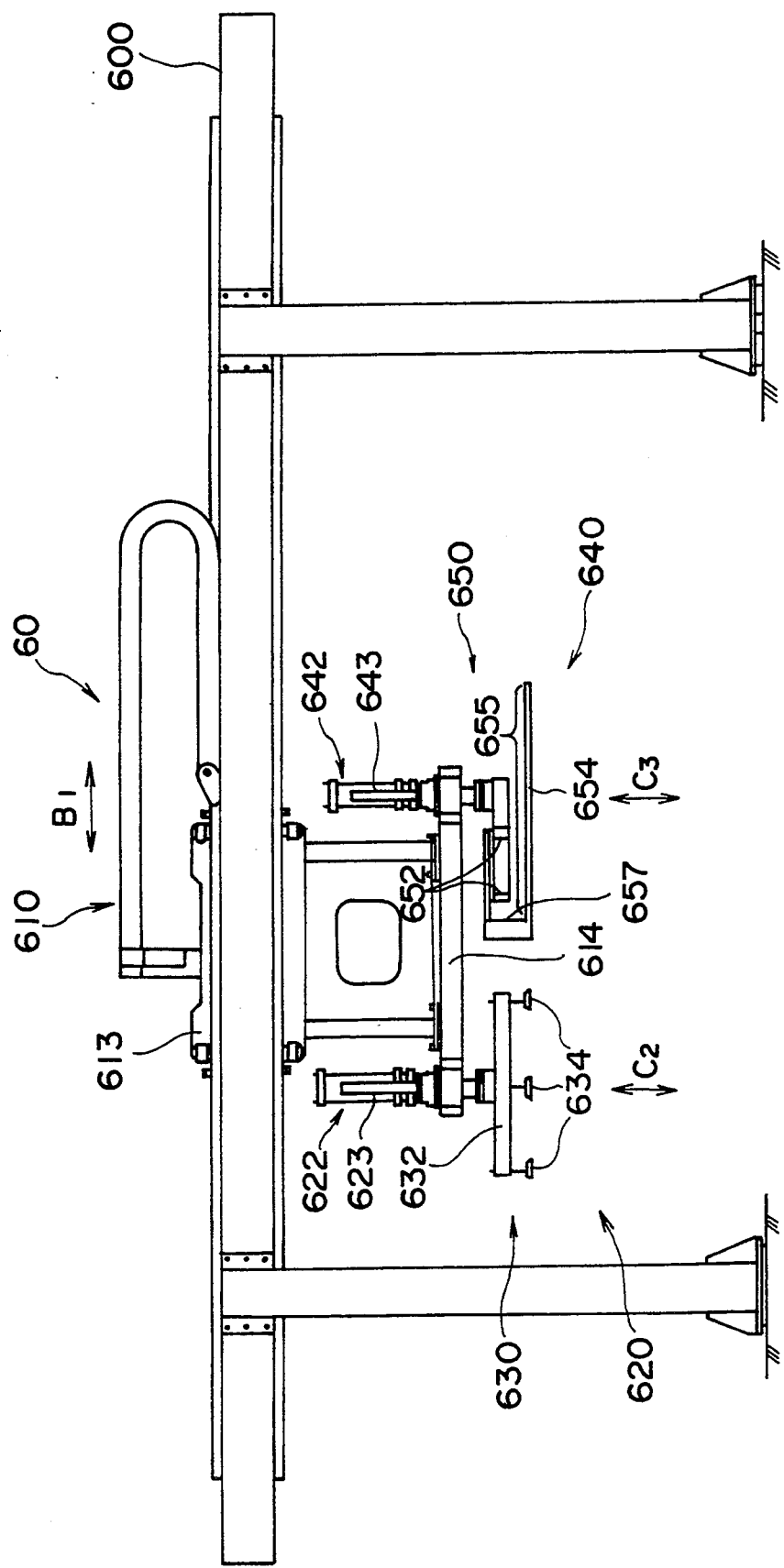
FIG. 3 is a side view of the work transfer device.

FIG. 2 and FIG. 3 show the details of the work transfer device 60. The work transfer device 60 is equipped with a guide rail 600 placed along the axis B1 crossing orthogonally with the axis A1 which is the direction of moving of the stacker crane 30. The guide rail 600 runs between the loading station 40 and the second unloading station 80 and is placed on the upper part of the device.

A mobile 610 is fixed to the guide rail 600. The mobile 610 has a body 613 which is guided by the guide rail 600 and moved by the motor 612. A frame 614 is fixed to the lower part of the body 613. A loader 620 and an unloader 640 are fixed to this frame 614. The loader 620 is equipped with a vacuum device 630 for vacuuming the work, and the unloader 640 is equipped with a fork device for scooping up the work.

The loader 620 has a support member 632 which is guided in the direction of the vertical axis C2 by the guide 623 to the frame 614. The movement of the support member 632 along the axis C2 is driven by the air cylinder 622. The support member 632 is equipped with a number of vacuum pads 634. The vacuum device 630 lowers on the upper surface of the plate-like work, and when vacuum is supplied to the vacuum pads 634 the vacuum device 630 secures the work by vacuum. Afterwards, by lifting the vacuum device 630 by driving the air cylinder 622, the uppermost work of the piled work on the pallet could be lifted.

The unloader 640 has a fork device 650 guided by the guide 643 to the frame 614. The movement of the fork device 650 along the axis C3 is driven by the air cylinder 642. The fork device 650 has a sub frame 652 and a fork 654 supported by the sub frame 652. The fork 654 is U-shaped at the cross section, and is fixed on the plane surface equally spaced from each other. The upper surface of the fork 654 is inserted under the work to hold the work. The end surface 657 of the fork 654 bent in the U-shape is provided with, for example, a limit switch and detects the presence of the work.

Therefore, the work transfer device 60 could hold the blank work at the loader 620 and hold the machined work at the unloader 640. The mobile 610 runs on the guide rail 600 while holding the work and transfers the work to the prescribed place.

Figure 4:
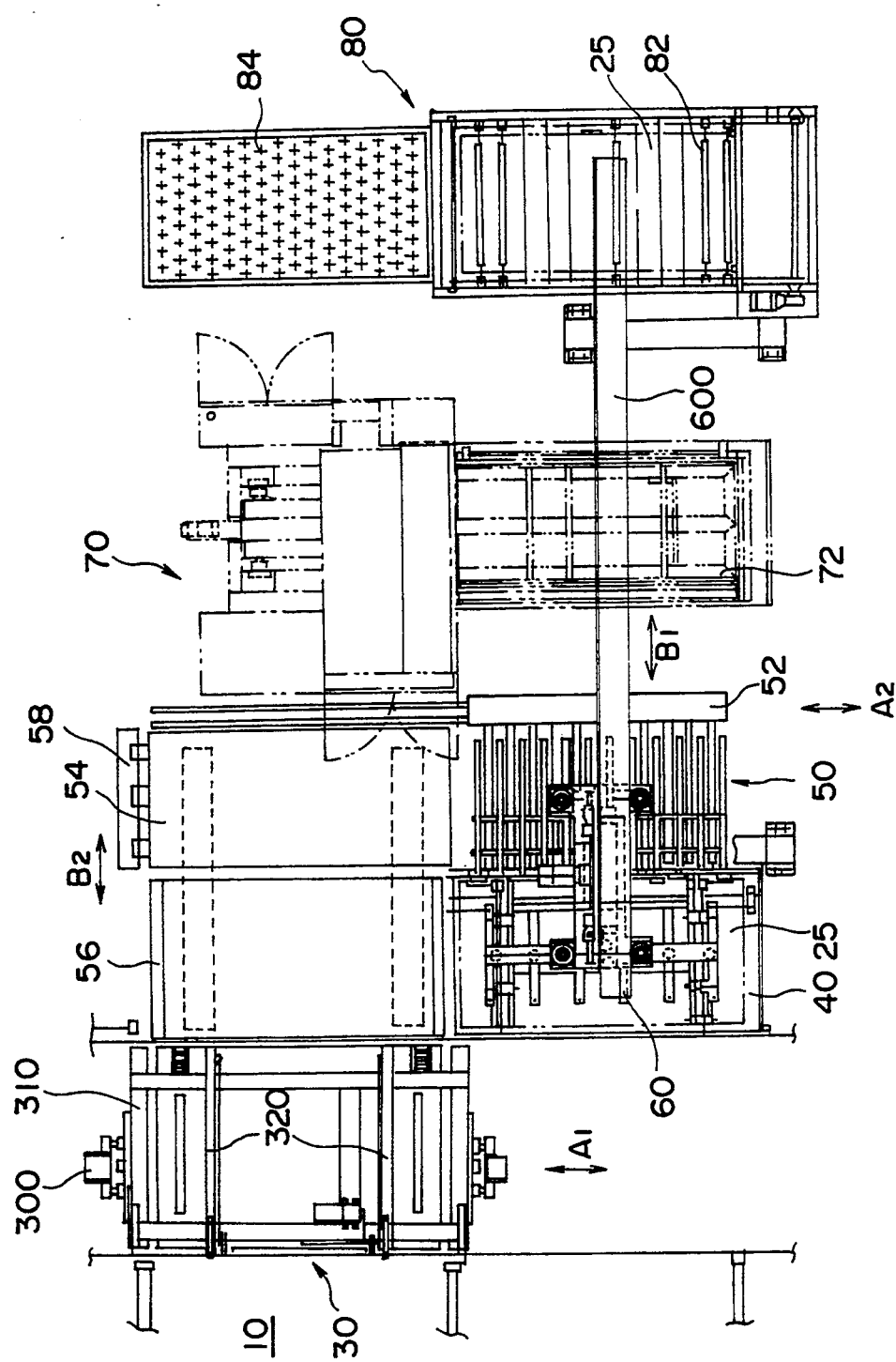
FIG. 4 is a plan view of a part of the system.

FIG. 4 is a plane view of the main part of the laser machining system.

The stacker crane 30 which runs on the rail provided along the axis A1 on the front side of the stack yard 10 is equipped with a mast 300 and a carriage 310 which moves up-and-down along the mast 300. A transfer device 320 of the pallet is equipped on the carriage 310. The transfer device 320 of the pallet runs the loading and unloading of the pallet to the stack yard 10 and to the loading station 40 placed opposite to the stack yard 10.

The pallet carrying the blank work is transferred to the loading station 40 by the stacker crane 30.

The loader 620 of the work transfer device 60 picks up the uppermost blank work piled on the pallet and supplies it to the table 72 of the laser machine 70.

The laser machine 70 provides necessary laser machining to the work supplied on the table 72.

The work with necessary machining done is unloaded from the table 72 of the laser machine 70 by the unloader 640 of the work transfer device 60.

The work with necessary machining done is usually transferred to the second unloading station 80 side. The second unloading station 80 is equipped with a number of rollers 82 placed in parallel and receives the work 25 from the unloader 640 of the work transfer device 60. The second unloading station 80 is equipped with a roller conveyer 82 as well as a chain conveyer, and could transfer the work to the adjacent work station 84.

The work 25 transferred to the work station 84 goes through necessary treatment by the operator and is unloaded from the present laser machining system as a finished product.

In some kind of work, it is needed to have only a part of machining done before returning it to the stack yard as a half-finished product. In the present system, a device for returning this half-finished product to the stack yard is added.

The first unloading station 50 is a device for returning worked product to the stacker crane side.

The first unloading station 50 is equipped with a carrier 52, lifter 54, pallet stand 56 and a work clamp 58.

The carrier 52 is equipped at the ripper part with a fork material for supporting the work and moves on the rail along the axis A2 which is in parallel with axis A1 of the stacker crane 30. The work carried from the carrier 52 is held by the work clamp 58 and piled on top of the lifter 54. The lifter 54 moves along the axis B2 which is in parallel with the moving axis B1 of the work transfer device and carries the pallet to the pallet stand 56. The pallet on the pallet stand 56 is carried to the stacker crane by the pallet transfer device 320 of the stacker crane 30 and is returned to the prescribed stack in the stack yard.

Figure 5:
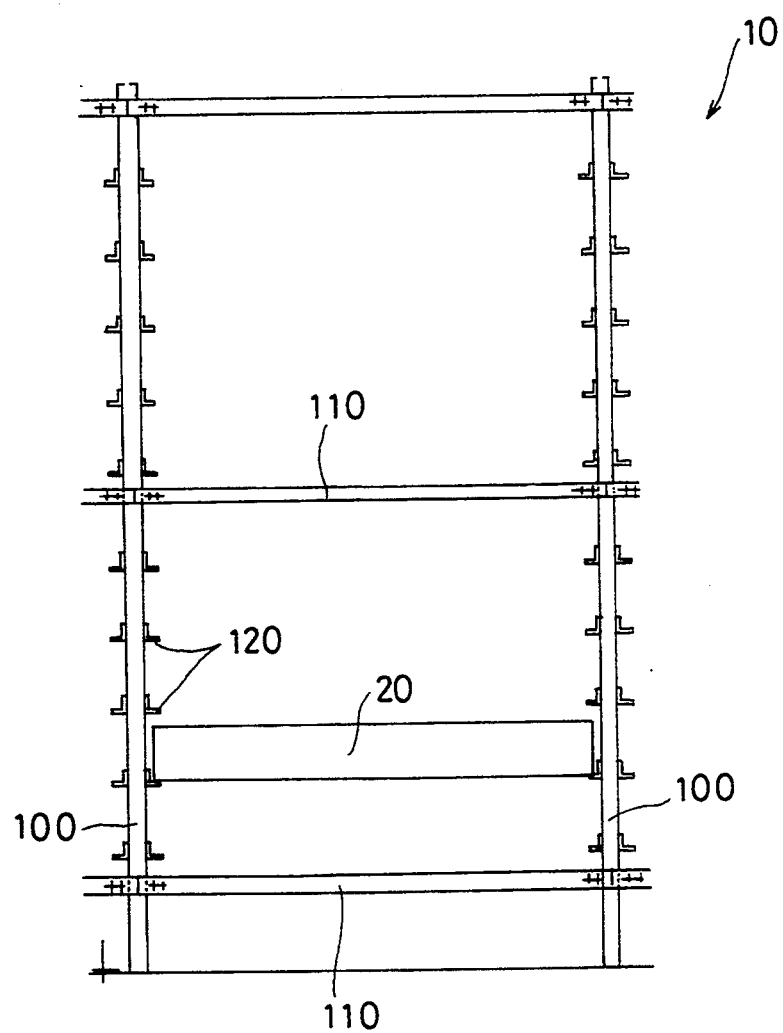
FIG. 5 is a front view of the stack yard.

FIG. 5 is a front view of the stack yard 10.

The stack yard 10 is composed of posts 100 and beams 110 which connects the posts. And, cross-sectionally L-shaped channels 120 are fixed at a prescribed interval to the both sides of each posts 100 to form stacks. By arranging a plurality of these stacks sideways, a stack yard is formed. The stack yard in FIG. 1 has nine rows of stacks arranged sideways. The capacity of stacks are chosen according to the size of the machining system. Pallets 20 are supported on top of the channels 120.

Figure 6:
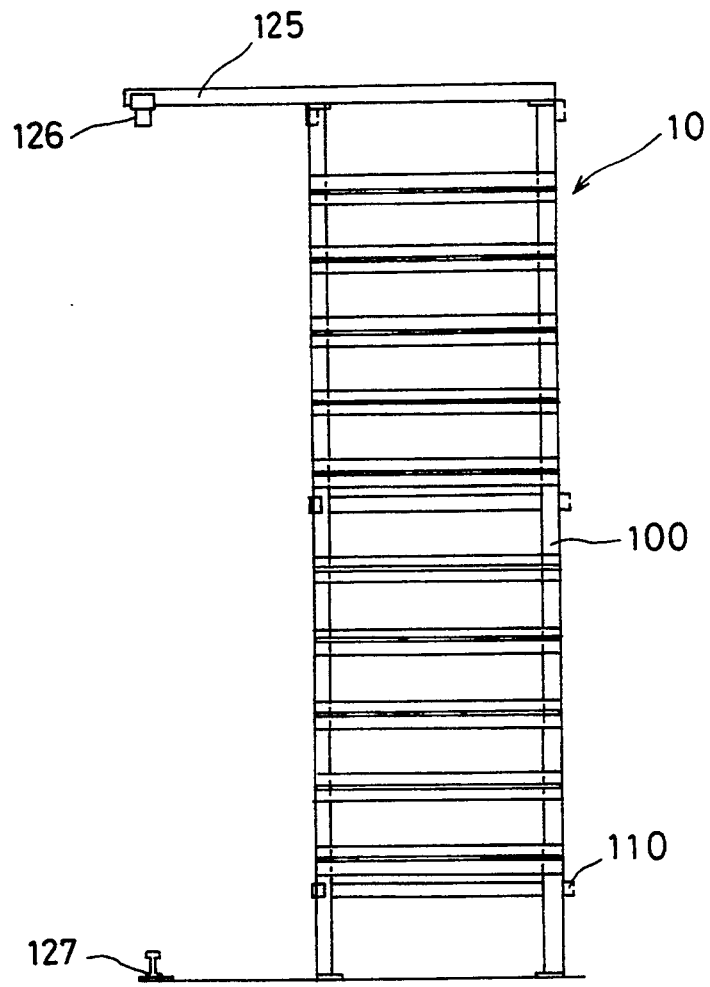
FIG. 6 is a side view of the stack yard.

FIG. 6 is a side view of the stack yard.

The uppermost part of the stack yard 10 composed of posts 100 and beams 110 is equipped with an upper rail 126 by the support stick 125. A lower rail 127 is fixed on the floor at the lower side.

Figure 7:
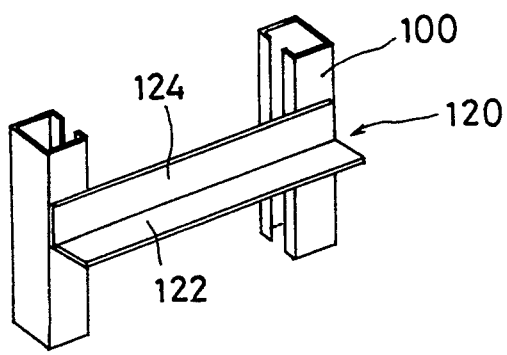
FIG. 7 shows detail of the stack.

FIG. 7 shows in detail the channel 120 composing the stacks. The channel 120 is equipped with a support portion 122 for supporting the load of the pallets and a guide portion 124 for guiding the pallets.

FIGS. 8A through 8C are an explanatory view of the pallet 20.

The pallet 20 has a frame 200 which is almost rectangular at two-dimension. The frame 200 is composed of a long side 202 and a short side 204. To the outer side of the short side 204 is equipped with one roller 210 each. This roller 210 collide with the guide portion 124 of the channel 120 of the stack yard and guides the pallet 20. The lower portion of short side 204 is equipped with one wheel 230 each. This wheel 230 rides on top of the support surface 122 of the channel 120 and supports the pallet 20.

To the outer side of the long side of the frame 200 is equipped with one pair of boss 220. A hole 222 is formed on the center of this boss 220. This hole 222 of the boss 220 match with the transfer device of the stacker crane.

Figure 9:
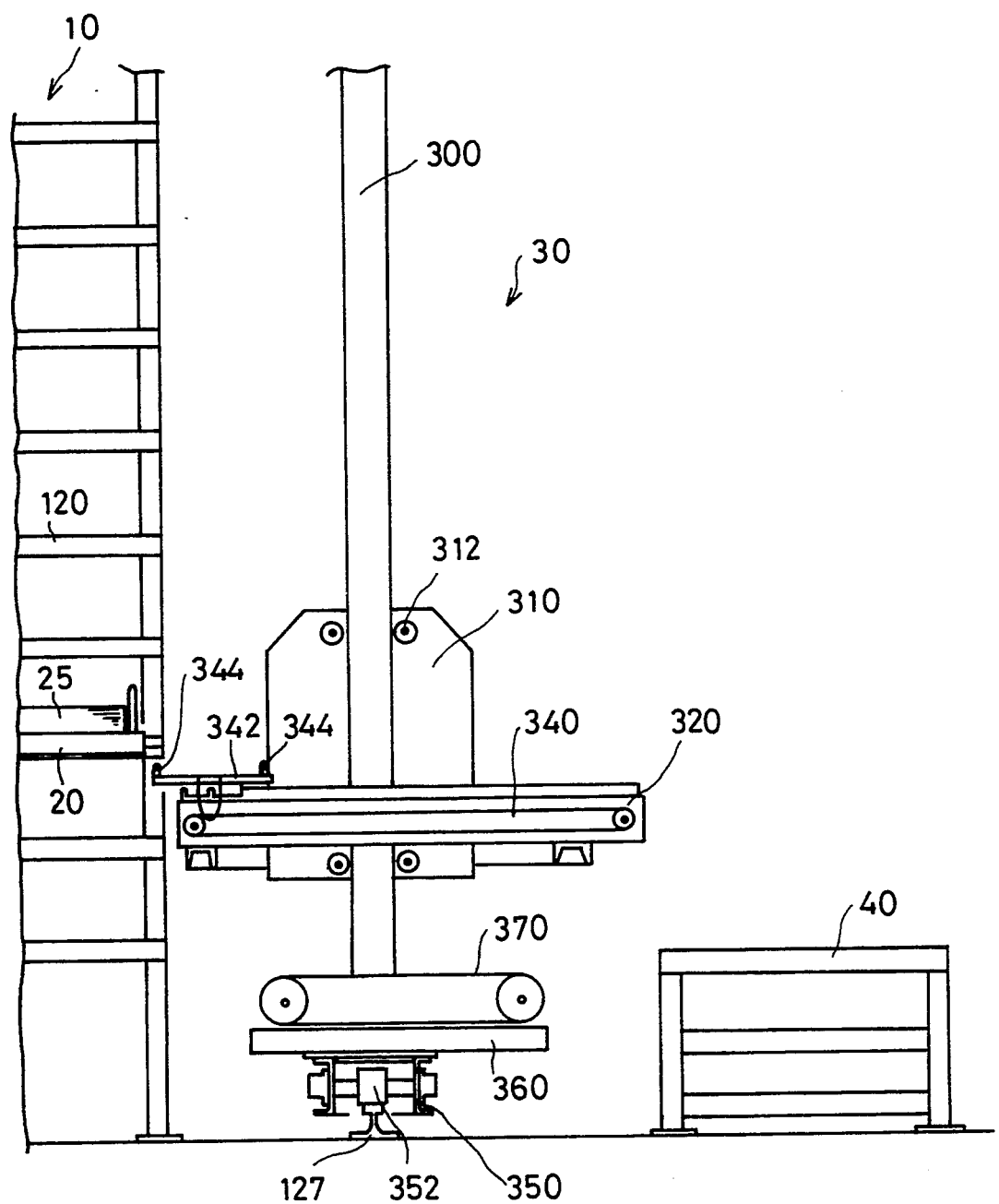
FIG. 9 is a side view of the stacker crane.

FIG. 9 shows the relation between the stack yard 10, stacker crane 30 and loading station 40.

Figure 10:
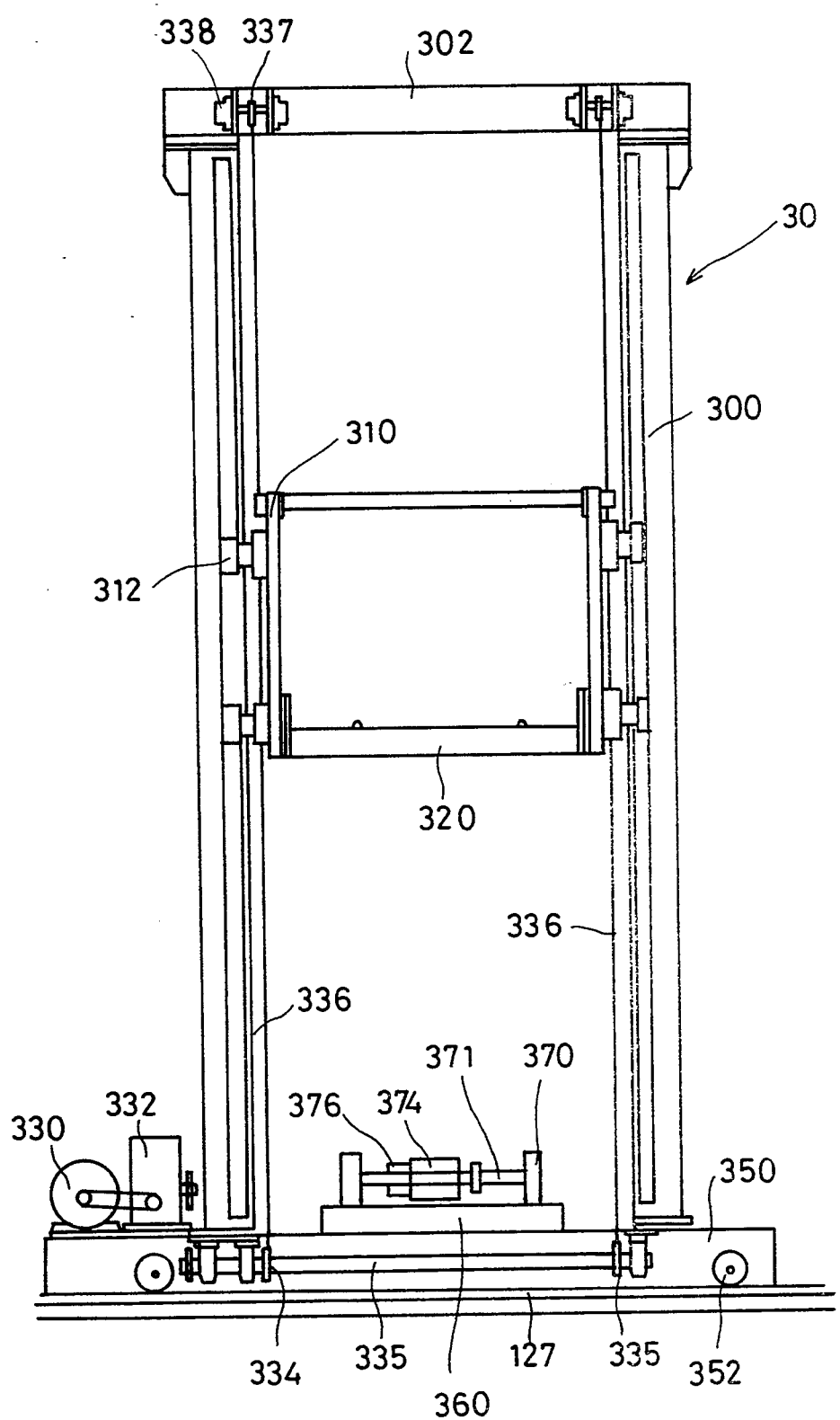
FIG. 10 is a front view of the stacker crane.

FIG. 10 is a front view of the stacker crane 30.

Figure 11:
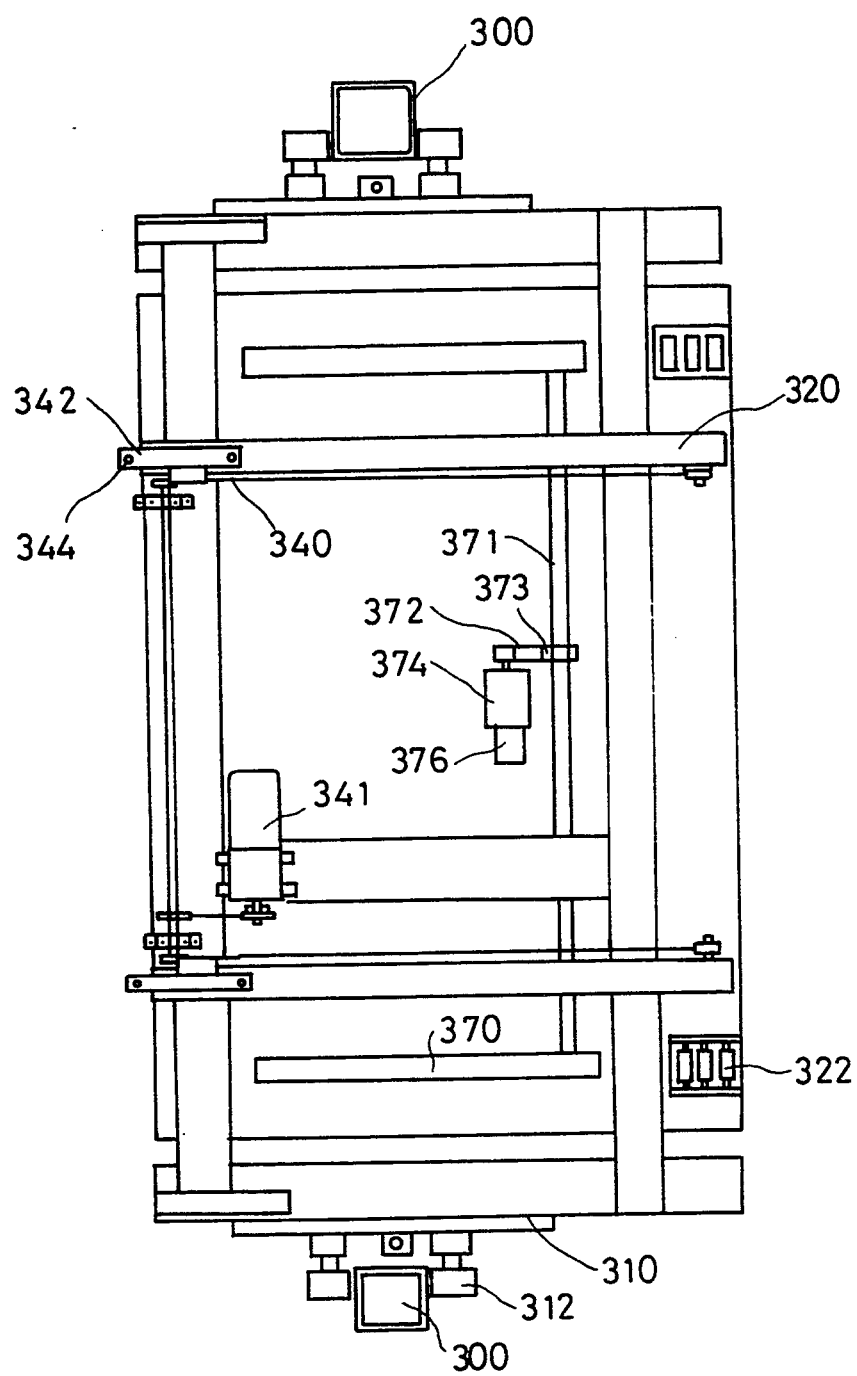
FIG. 11 is a plan view of the carriage.

FIG. 11 is a plan view of the carriage.

The stack yard 10 stores the pallet 20 for piling the work 25 on the stack composed by each cannel 120.

The stacker crane 30 is equipped with a frame 350 supported on the lower rail 127 through wheels 352. One pair of mast 300 is fixed on the frame 350. The upper portion of the masts 300 is connected by the upper frame 302. One pair of belt conveyer 370 is set on the frame 350 through a base 360.

The belt conveyers 370 are connected to each other by a shaft 371. The shaft 371 is driven by the motor 374 through a sprocket 373 and a chain 372. The amount of rotation of the motor 374 is counted by an encoder 376. Therefore, the moving distance of the belt conveyer 370 can be controlled.

The carriage 310 is supported movable up-and-down by the roller 312 to the mast 300. A pallet transfer device 320 is equipped to the lower portion of the carriage 310. The pallet transfer device 320 moves on the carriage by the chain conveyers 340 and 342. The pallet transfer device is equipped with a pallet drag device 342.

The motor set on the carriage drives the chain conveyer 340 and moves the pallet drag device 342. The pallet drag device 342 has a pin 344. The pin 344 engage with the hole provided on the boss 220 of the pallet 20 and the pallet drag device 342 drags out the pallet 20 from the stack of the stack yard 10 to the carriage.

The carriage 310 with the pallet 20 set on it rises to the prescribed place.

Figure 12:
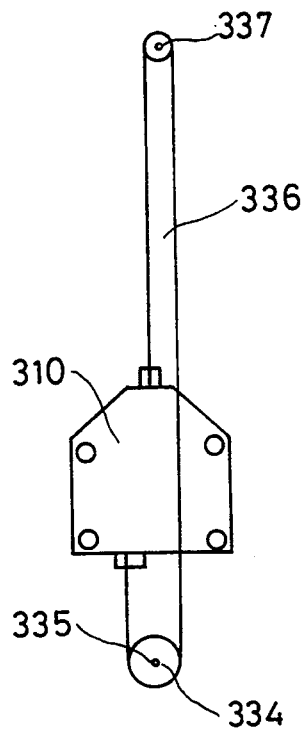
FIG. 12 is an explanatory view showing the lifting mechanism of the carriage.
Figure 13:
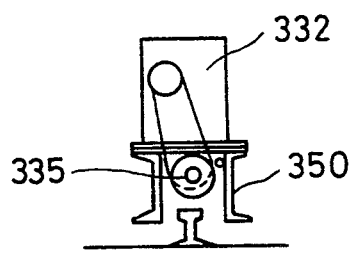
FIG. 13 shows the driving mechanism of carriage.
Figure 14:
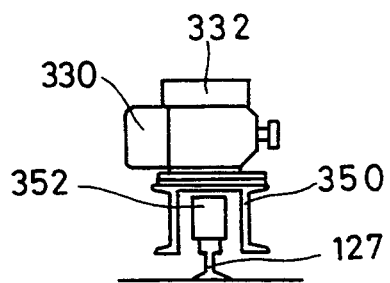
FIG. 14 shows the driving mechanism of carriage.

FIGS. 12, 13 and 14 shows the elevation mechanism of the carriage 310.

A motor 330 and a reduction gear box 332 are equipped on the frame 350 of the stacker crane 30. The reduction gear box 332 driven by the motor 330 drives the shaft 335 provided inside the frame 350, The shaft 335 is provided with two sprockets 334. Each sprocket 334 drives the chain 336. The upper portion of the chain 336 engage with the sprocket 337 formed on the upper frame 302 and each end portion of the chain 336 is connected to carriage 310. Therefore, when the chain 336 is driven, the carriage 310 elevates. For example, by detecting the number of rotation of the upper sprocket 337 by rotary encoder 338 and the like, the height and the place of the carriage 310 could be controlled accurately.

Figure 15:
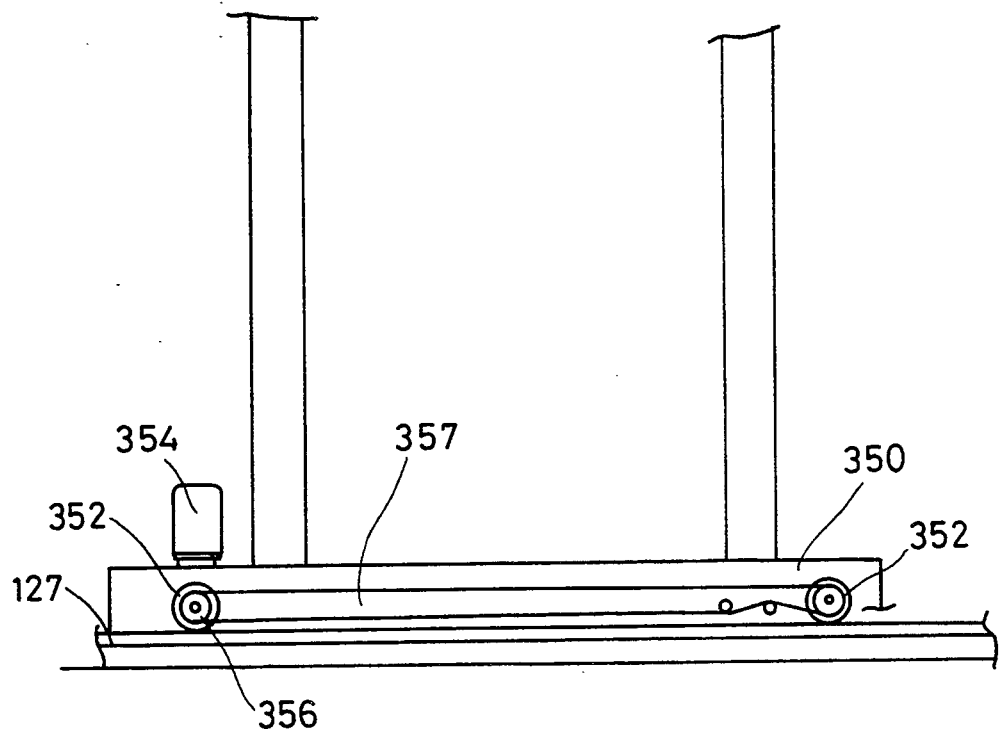
FIG. 15 shows the driving mechanism of the crane.
Figure 16:
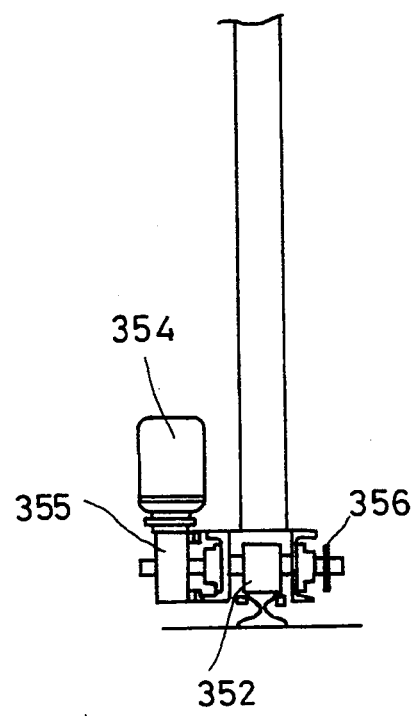
FIG. 16 shows the driving mechanism of the crane.

The stacker crane 30 with pallet 20 on it runs on the rail 127 and reaches the loading station 40, FIGS. 15 and 16 shows the moving device of the stacker crane 30.

The motor 354 fixed on the frame 350 drives one of the wheel 352 through a reduction gear box 355. The sprocket 356 fixed to the shaft drives the other wheel 352 through the chain 357. By detecting the number of rotation of this wheel and the like by the rotary encoder, the place of the stacker crane 30 on the rail 127 could be detected accurately.

When arriving at the loading station 40, the stacker crane 30 cooperates with the belt conveyer 370 and transfers the pallet on the carriage 310 to the loading station 40.

FIGS. 17A through 17C and 18A through 18G show the operation of the pallet transfer device 320.

Figure 17A:
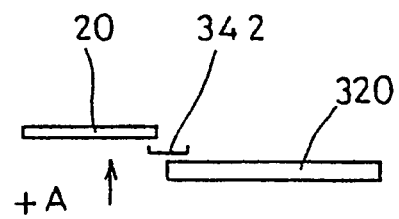
FIG. 17A–C show the operation of the pallet moving mechanism of the carriage.
Figure 17B:
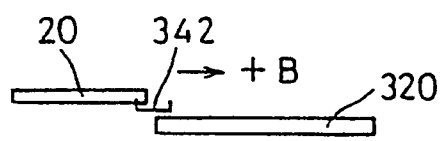
Figure 17C:
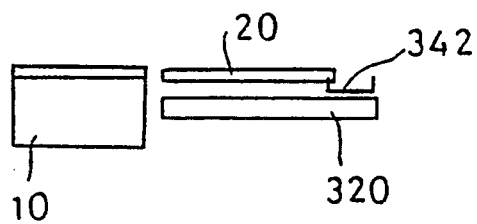

FIG. 17A through 17C show the movement of transferring the pallet 20 stored in the stack yard 10 onto the carriage of the stacker crane.

The pallet transfer device 320 facing the front of the pallet to be loaded in the stack yard 10 is placed slightly lower from the object pallet 20. The pallet tow device is engaged with the hole 222 of the boss 220 of the pallet 20 by rising the carriage 310 in the direction of +A while projecting the pallet tow device 342. By operating the chain conveyer of the pallet transfer device 320 and moving the pallet tow device 342 in the direction of +B, the pallet 20 is towed from the stack of the stack yard 10 and moved onto the pallet transfer device 320 of the carriage.

Figure 18A:
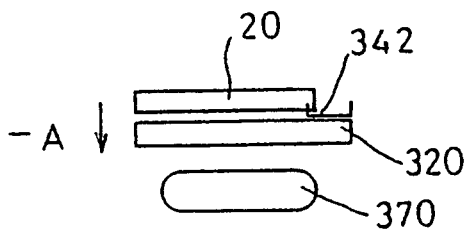
FIG. 18A–C show the operation of the pallet moving mechanism of the carriage.
Figure 18B:
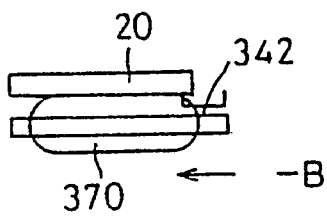
Figure 18C:
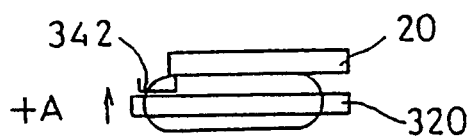
Figure 18D:
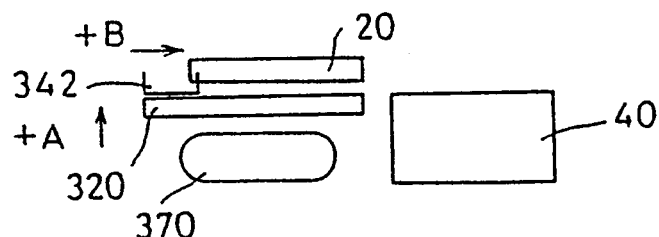
Figure 18E:
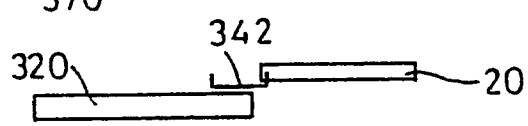
Figure 18F:
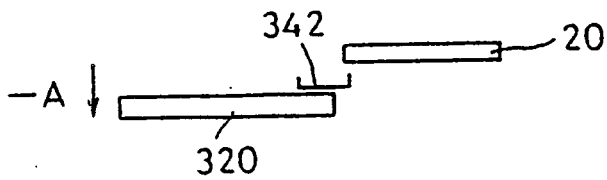
Figure 18G:
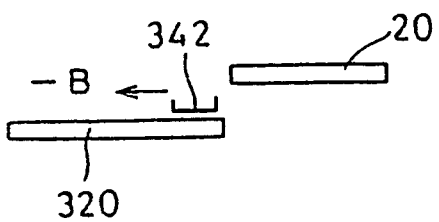

FIG. 18A through 18C show the operation of moving the pallet on the carriage to the loading station 40.

The pallet transfer device 320 is lowered in the direction of −A with the carriage. The belt conveyer 370 is provided on the frame of the stacker crane 30. By lowering the pallet transfer device 320, the pallet 20 is supported on the belt conveyer 370 as shown in (2). At this point, the pallet tow device 342 disengage with the pallet 20. Next, the pallet tow device 342 is moved in the direction of −B. Then, by elevating the pallet transfer device 320 along with the carriage 310 slightly in the direction of +A, the pallet tow device 342 is engaged with the pallet 20. The carriage is further elevated to match the upper surface of the pallet transfer device 320 to the upper surface of the loading station 40. At this point, the pallet 20 is supported on the pallet transfer device 320. Then, the pallet 20 is pushed to the loading station 40 side by moving the pallet tow device 342 in the direction of +B. And by lowering the pallet transfer device 320 along with the carriage slightly in the direction of −A, the pallet tow device 342 is disengaged with the pallet 20. The transferring of pallet to the loading station 40 is finished by returning the pallet tow device 342 in the direction of −B.

The roller conveyer 322 provided on the carriage also plays a part in this movement of the pallet.

The procedure of returning the pallet on the loading station 40 to the stack yard 10 side runs the above-mentioned procedure backwards.

By repeating the above-mentioned procedure, pallets could be freely transferred by the stacker crane between the stack yard, loading station and the unloading station of the laser machining cell.

Figure 19:
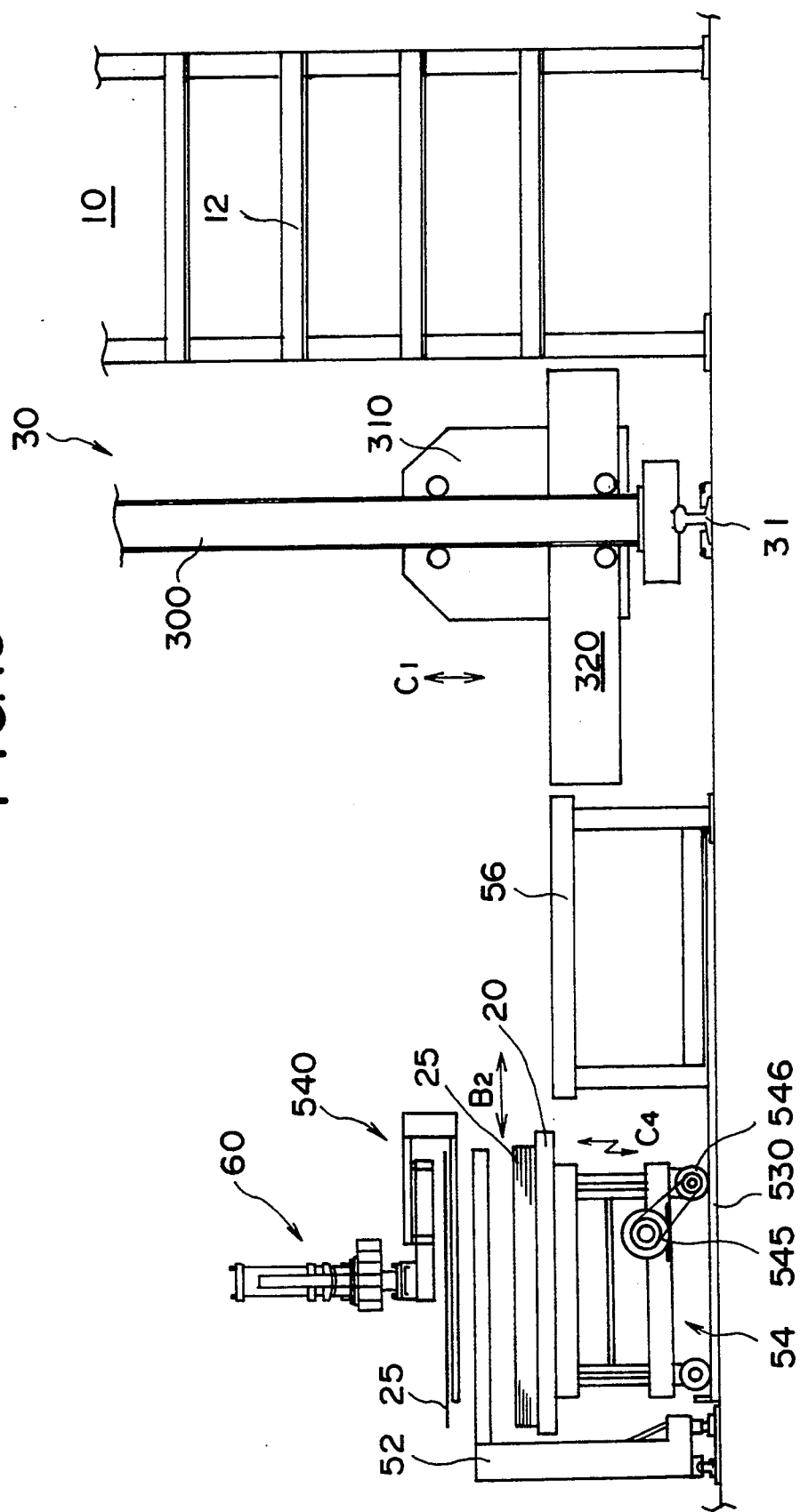
FIG. 19 an explanatory view showing the relation of the present invented device to the stack yard and stacker crane.
Figure 20:
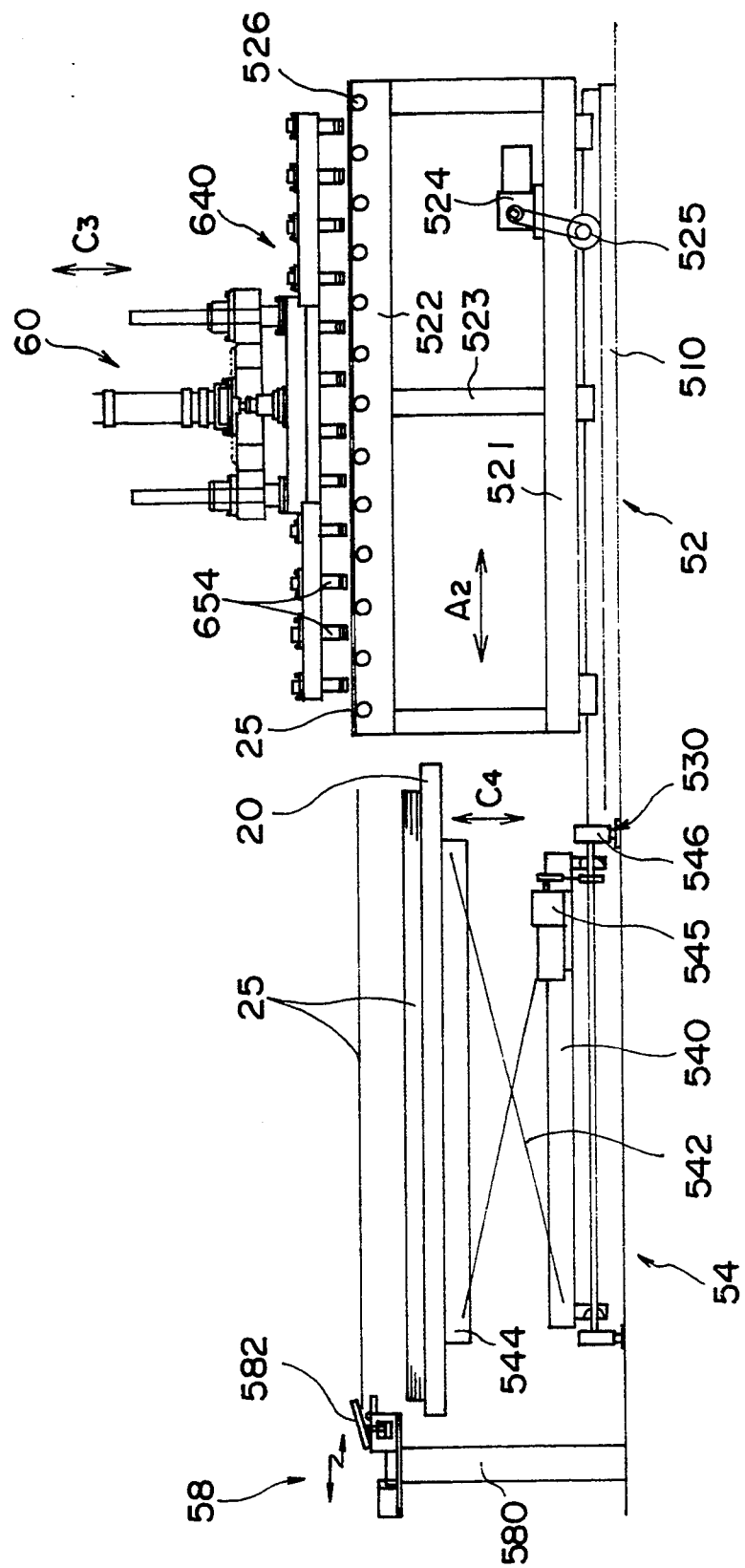
FIG. 20 is a explanatory view showing the details of the carriage and lifter.
Figure 21:
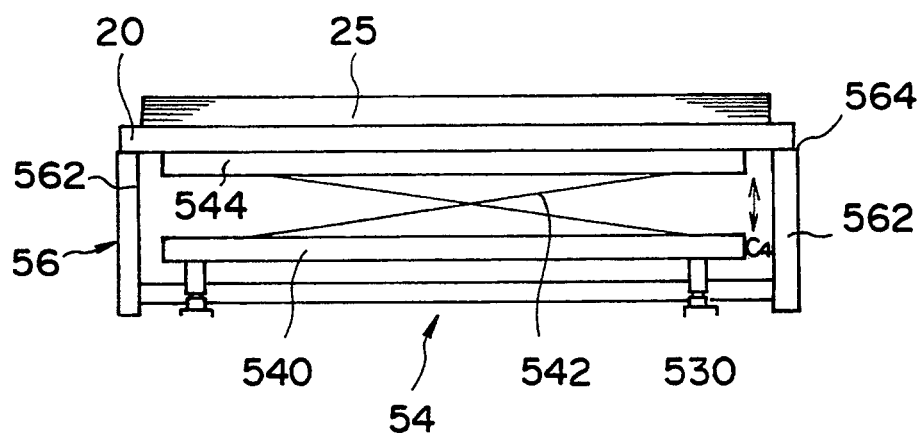
FIG. 21 is a explanatory view showing the pallet stand.

FIGS. 19, 20 and 21 shows the details of the devices comprising the first unloading station 50.

In FIG. 20, carrier 52 is equipped with a lower frame 521 and an upper frame 522 supported by the column 523. The lower frame 521 is equipped with a motor 524. The driven wheel 525 runs on the rail 510 and moves the carrier 52 as a whole along the axis A2. A fork 526 is fixed to the upper frame 522. As the supporting part 654 of the unloader of the work transfer device 60 moves down along axis C3 while supporting the work, the work on the supporting portion 654 is transferred to the fork 526 of the carrier 52. The carrier 52 which supports the work 25 on the fork 526 moves along the axis A2.

The end portion of the work 25 transferred while supported on the carrier 52 is stopped by the work clamp 58.

The work clamp 58 is equipped with a post 580 and a gripper device 582 of work fixed on the post 580. The gripper device 582 could be opened and closed and grips the end of the work 25.

When the carrier 52 returns while the work 25 is held by the work clamp 58, the work 25 is piled on top of the lifter 54.

The lifter 54 is equipped with a lower frame 540 and an upper frame 544 which is supported by a pantograph mechanism 542. Wheels 546 of the lower frame 542 is driven by a motor 545 and moves the lifter 54 to the direction of the axis B2 along the rail 530. The upper frame 544 could be moved up and down in the direction of the axis C4 with the pantograph mechanism 542. The upper surface of the upper frame 544 supports the pallet 20, and work 25 is piled on top of the pallet 20. When the prescribed number of work 25 is piled on top of the pallet 20, the lifter 54 moves along the axis B2 and reaches the pallet stand 56. The pallet stand 56 is equipped with posts 562 set on both sides. The posts 562 are set so as to support both ends of the pallet 20.

When the upper frame 544 is lowered along the axis C4 by operating the pantograph mechanism of the lifter 54, the pallet 20 is supported by the post 562 of the pallet stand 56. A positioning means 564 for pallet is provided on the upper portion of the post 562.

The stack yard 10 is provided with stacks 12 divided vertically. A rail 31 is provided on the front side of the stack yard 10. The stacker crane 30 which moves on the rail 31 is equipped with a mast 300 and a carriage 310 which moves up and down on axis C1 along the mast 300. The carriage 310 is equipped with a pallet transfer device 320. The pallet transfer device 320 moves the pallet on the pallet stand 56 onto the carriage 320.

The stacker crane 30 with pallet on the carriage 320 stores the pallet 20 on the prescribed stack 12 of the stack yard.

The present device could, with the above-mentioned structure, return the work with one part of machining done by the laser machine 70 to the stack 12 of the stack yard 10 while carried on the pallet.

The present invention could, as mentioned above, return the half-finished product automatically to the stack yard in a laser machining system having a laser machine, a stacker crane for supplying pallet with work loaded to the laser machining cell equipped with a work transfer device and a stack yard for storing pallets by adding a device for returning half-finished product with only one part of laser machining done to the pallet.

Therefore, the laser machine maintains the continuous machining. The work could be returned to the stack yard as a half-finished product or unloaded to unloading station which handles the finished products. In the present manufacturing system, laser machining could be continued automatically even when there is no operator at the unloading station side for finished products. Therefore, productivity is increased dramatically.

Figure 22:
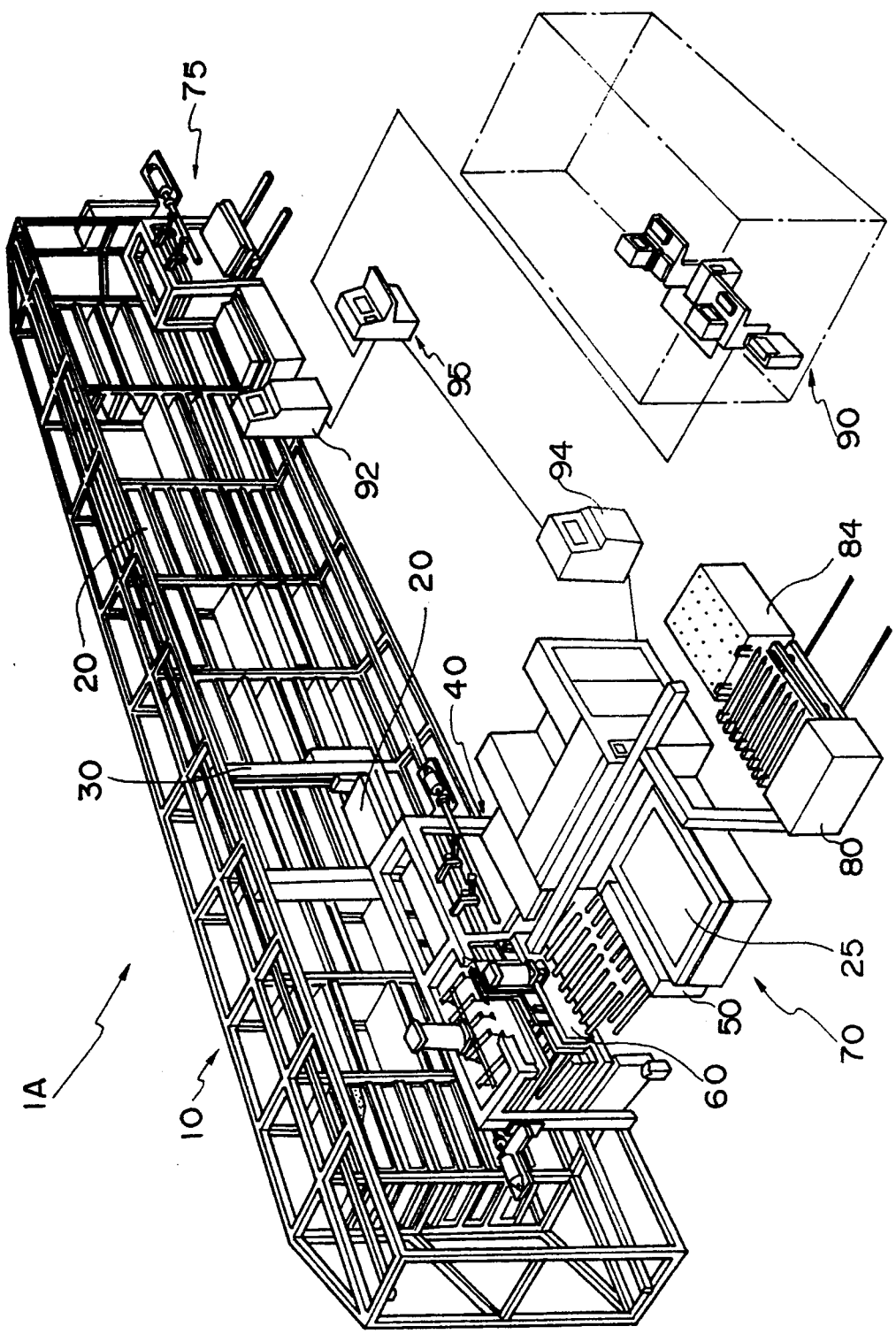
FIG. 22 is a perspective view of the other embodiment of the present invention.

FIG. 22 is an explanatory view showing the outline of the other embodiment of laser machining system of the present invention.

The laser machining system shown as a whole by the number 1A is provided with a stack yard 10. Pallets 20 are stored in each stack of the stack yard 10. Other than the type which places plurality of blank plates on the regular pallet base, the pallet 20 has a type which layers multiple of pallet components on the regular pallet base. Each pallet component stores one plate-like work to be machined. The plate to be stored in the pallet includes blank plate (pre-worked plate) and particularly finished plate (post-worked plate) which has been machined in the prior procedures. This layered pallet components are hereinafter referred to as multi-pallets.

The stacker crane 30 is equipped on the rail provided on the front side of the stack yard 10. The stacker crane 30 transfers the multi-pallet 20 between the stack yard 10 and the pallet separation station 40 provided adjacent to the plate machining device 70. A laser machine is used in the present example as the plate machining device 70. However, it is possible to use other plate machining device such as punching machine and the like.

The separation station 40 chooses a pallet from the multi-layered multi-pallet and by cooperating with the transfer device 60 transfers the plate inside the pallet to the laser machining device 70. After the necessary machining is done to the work 25 supplied on the table of the laser machine 70, the machined work is transferred while remaining available to the first unloading station 80 or the second unloading station 50 which are provided on both sides of the laser machining device 70. The second unloading station 80 is provided with a sorting station 84 and has the ability to cut the product from the machined work and send it to the next procedure and the like.

To the edge of the stack yard 10, a loading station 75 for loading the plate in the pallet and taking out the machined work is provided.

The loading station 75 is equipped with a pallet separator and a lifter and has the same composition as the second separator described afterwards.

The operation of the laser machining system 1A is controlled by the management controller 95. The program of the laser machining device 70 could directly be obtained from the CAD/CAM 90. The management controller 95 gives necessary orders to the stack yard controller 92 and the line controller 94.

Figure 23:
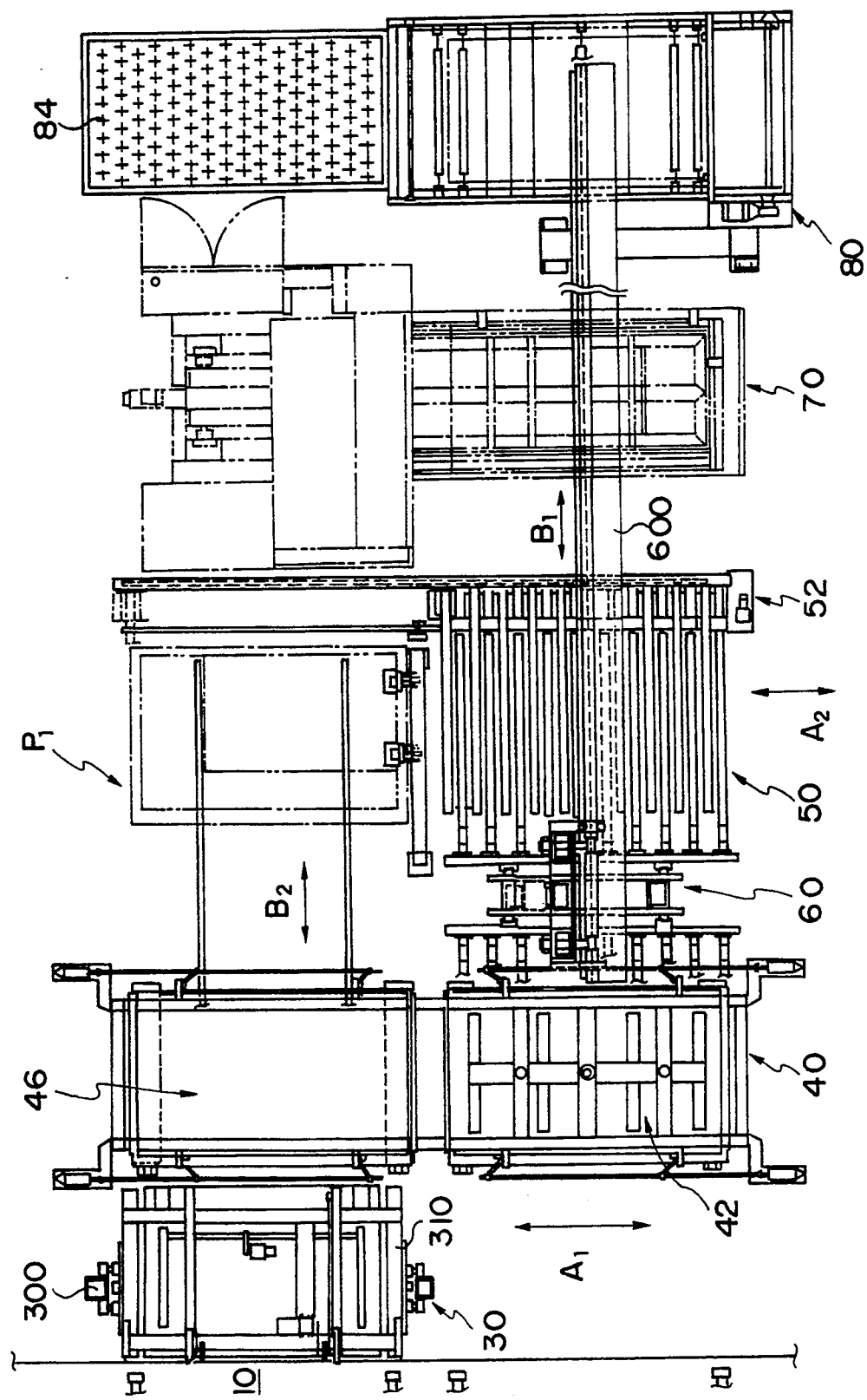
FIG. 23 is a plan view of a part of the system.
Figure 24:
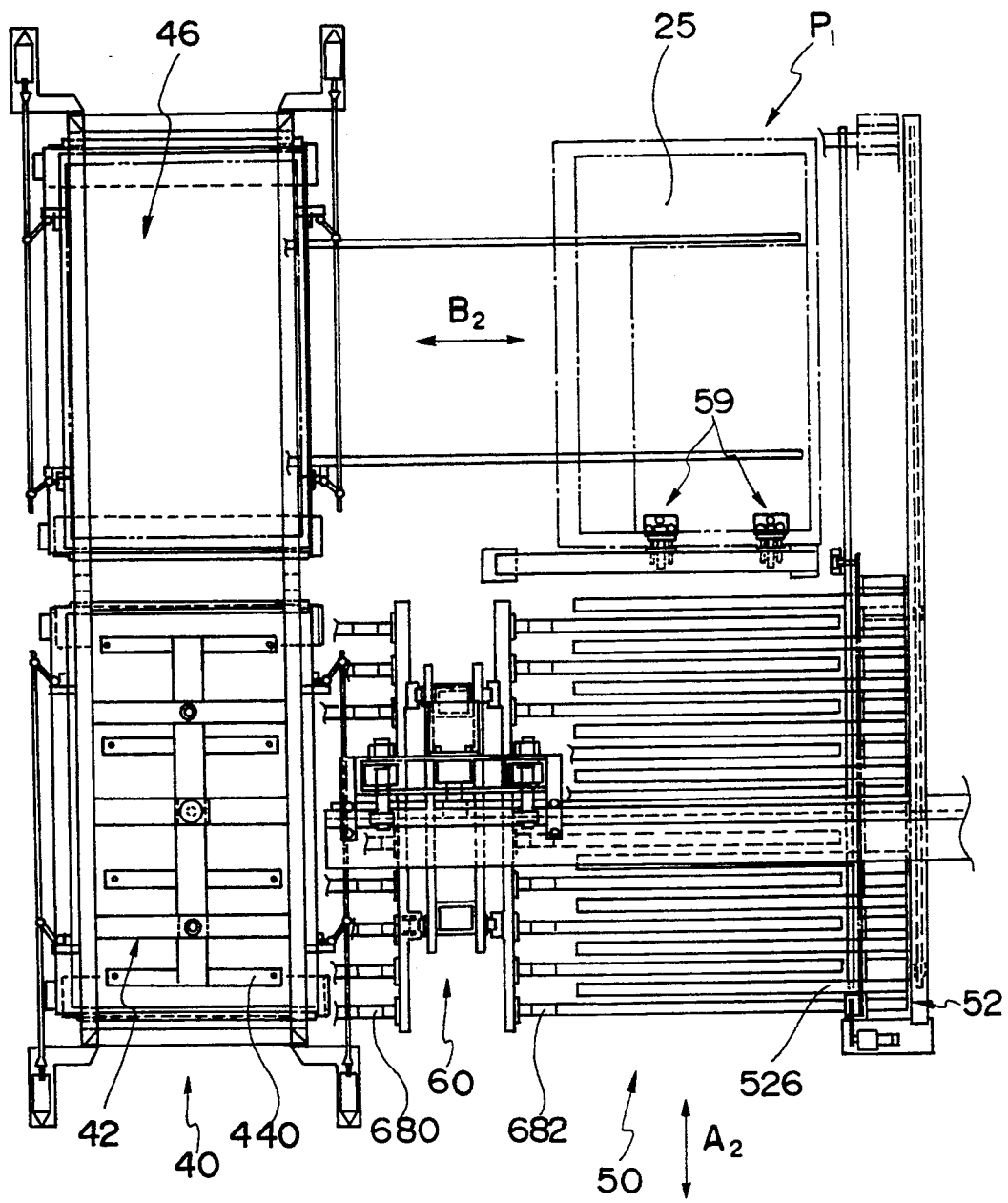
FIG. 24 is a plan view of a part of the system.

FIG. 23 is a plan view showing the placement of the laser machining system and FIG. 24 is a plan view of the main part of the system.

The stacker crane 30 which runs on the rail provided in the direction of axis A1 is provided on the front side of the stack yard 10. The separation station 40 is provided on the stacker crane 30 side opposite the stack yard 10. The separation station 40 is equipped with a first separator 42 at the side for loading the plates to the laser machining device 70 and a second separator 46 at the side for returning the machined work to the multi-pallet.

The plate transfer device 60 is provided movably along the moving axis B1 on the rail 600 provided crossing orthogonally with the moving axis A1 of the stacker crane 30. The plate transfer device 60 is equipped with two pair of forks projecting in the opposite direction. The first fork transfers pre-worked plate and the second fork transfers the post-worked plate.

The work transferred by the transfer device 60 to the laser machining device 70 is put through necessary machining. The machined work is transferred by the transfer device 60 to the second unloading station 80 or the first unloading station 50.

The first unloading station 50 is equipped with a carrier which moves along the axis A2 running parallel to the moving axis A1 of the stacker crane 30. The carrier is equipped with a fork. The carrier receives machined work from the second fork of the transfer device and moves along the axis A2.

The second separator 46 of the separation station 40 is equipped with a lifter which moves along the axis B2 running parallel to the moving axis B1 of the transfer device 60. The lifter moves along the axis B2 while holding the pallet chosen by the second separator 46 at the uppermost surface and waits at the delivery point P1. The post-worked plate transferred by the carrier is gripped by the work clamp when reaching the delivery point P1. The plate is transferred on to the waiting pallet when the carrier returns.

The lifter returns to the second separator 46 and reconstructs the multi-pallet.

FIG. 24 is a plan view showing the relation between the separation station 40 and the first unloading station 50.

The separation station 40 is equipped with a first separator 42 on the providing side and a second separator 46 on the returning side. The first separator 42 is equipped with a vacuum pad 440 which is used for providing blank plates.

The first separator 42 coacts with the first fork 680 of the transfer device 60 and provides the pre-worked plate to the laser machining device. The post-worked plate is taken out by the second fork 682 of the transfer device 60 from the table of the laser machining device and transferred to the first unloading station 50.

The carrier 52 of the first unloading station has a fork 526 and receives the post-worked plate 25 from the second fork 682. The carrier with plate 25 placed on top of the fork 526 moves in parallel with the axis A2 to the delivery point P1. The lifter with empty pallet loaded is waiting at the delivery point P1. The fork 526 of the carrier is positioned at the upper portion of the lifter. The work clamp 59 grips the end portion of the plate 25. At this point, the carrier is returned to the first separator 42 side and the plate 25 is moved onto the empty pallet component.

Figure 25:
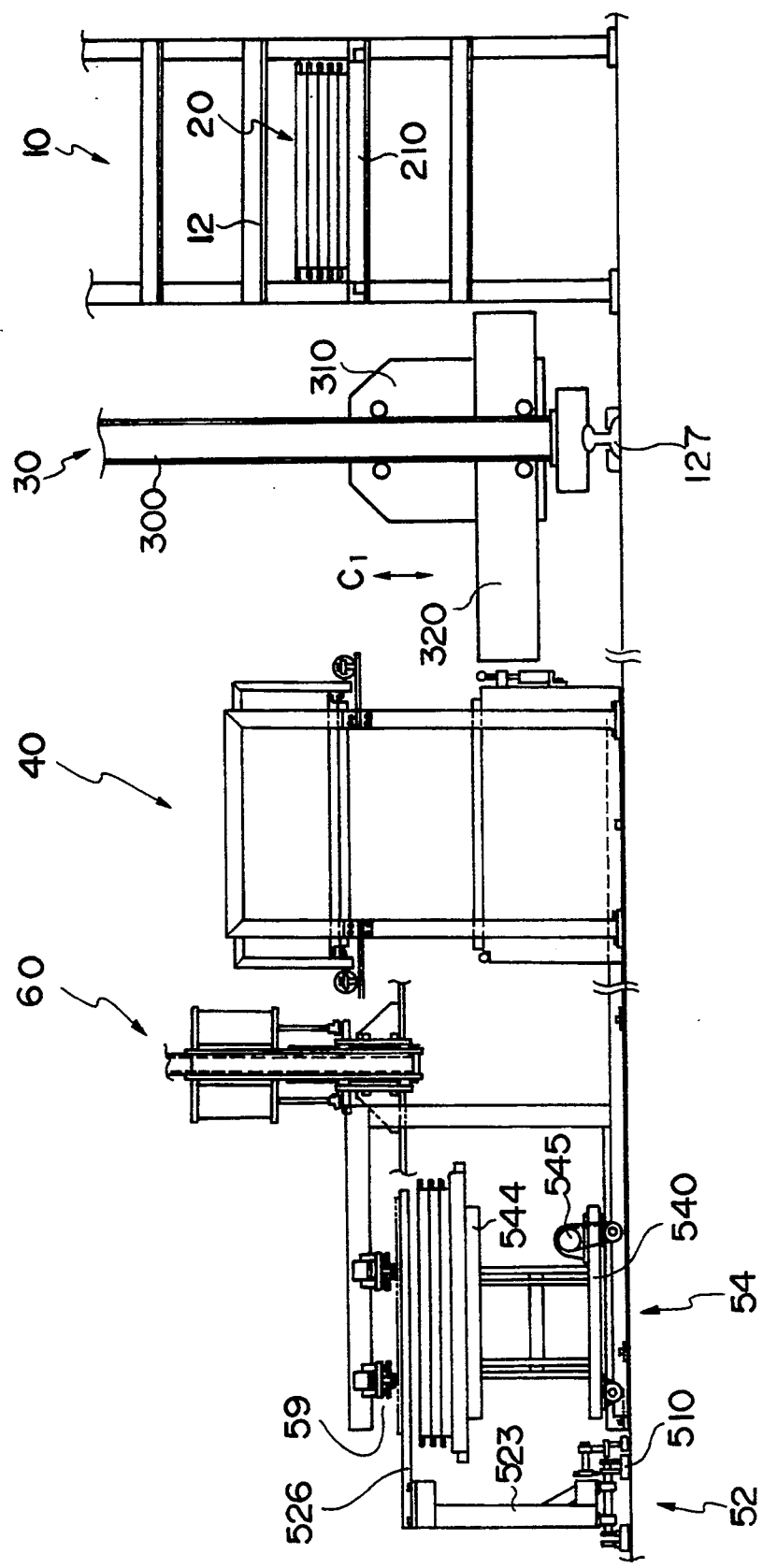
FIG. 25 is a side view of a part of the system.
Figure 26:
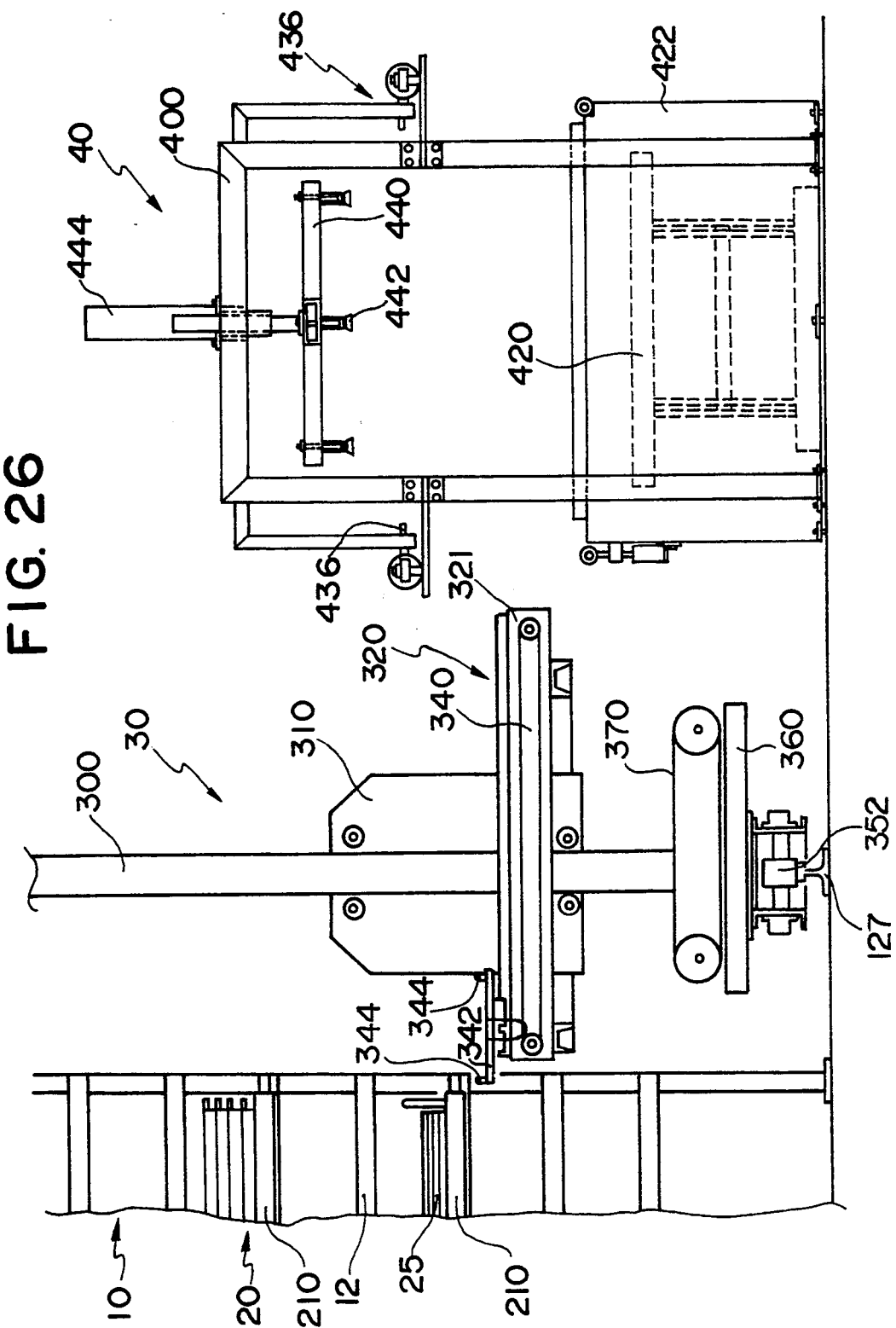
FIG. 26 is a side view of a part of the system.

FIG. 25 is a side view showing the layout of the stack yard 10, stacker crane 30, separation station 40, transfer device 60, carrier 52 of the second unloading station and lifter 54. FIG. 26 is a side view showing the main part of FIG. 25 from the opposite side.

The multi-pallet 20 layered on top of the pallet base 210 is stored in the stack 12 of the stack yard 10. On the other hand, in case of a blank plates, it is possible to store them by layering blank plates 25 directly on top of the pallet base 210.

The stacker crane 30 is equipped with a car 360 moving on the rail 127 by the roller 352 and one pair of mast 300 fixed on the car 360. The stacker crane 30 is also equipped with a carriage 310 which elevates in the direction of axis C1 along the mast 300. The carriage is guided against the mast and is elevated by the elevation motor, chain and the like not shown.

The stacker crane 30 is equipped with a pallet transfer device shown by the number 320. This pallet transfer device 320 is equipped with a belt conveyer 370 fixed on the car 360 and a chain mover 340 fitted to the frame 321 which is in a body with the carriage 310. A pallet tow device 342 is fixed to the chain 340. This pallet tow device 342 has a pin 344 projecting on the upper surface. The pallet tow device tows pallets by engaging the pin 344 to the hole of the pallet base 210. And by cooperating with the belt conveyer 370 on the car 360, transfers the multi-pallets between the stack yard 10 and the separation station 40.

Figure 27:
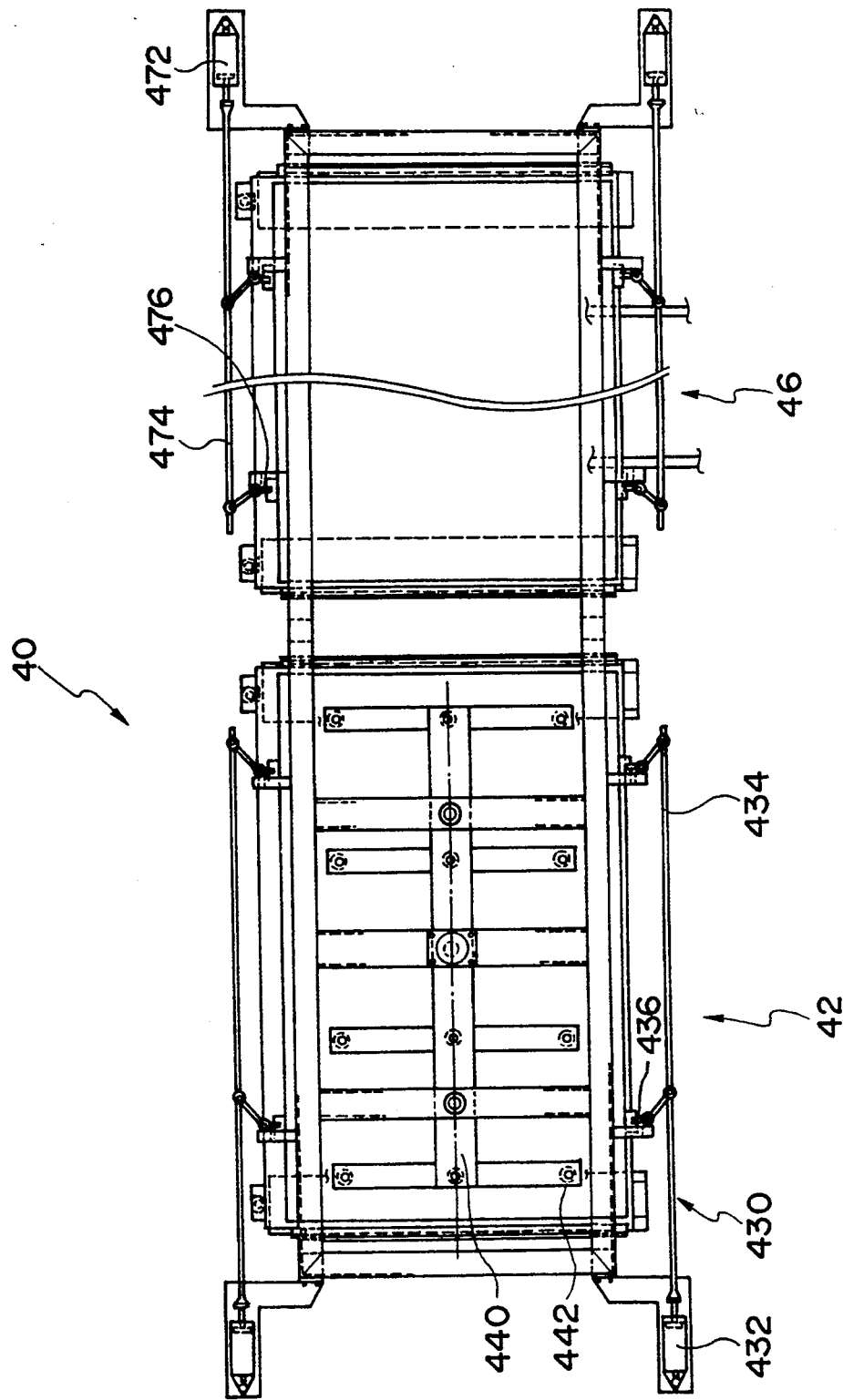
FIG. 27 is a plan view of the separation station.
Figure 28:
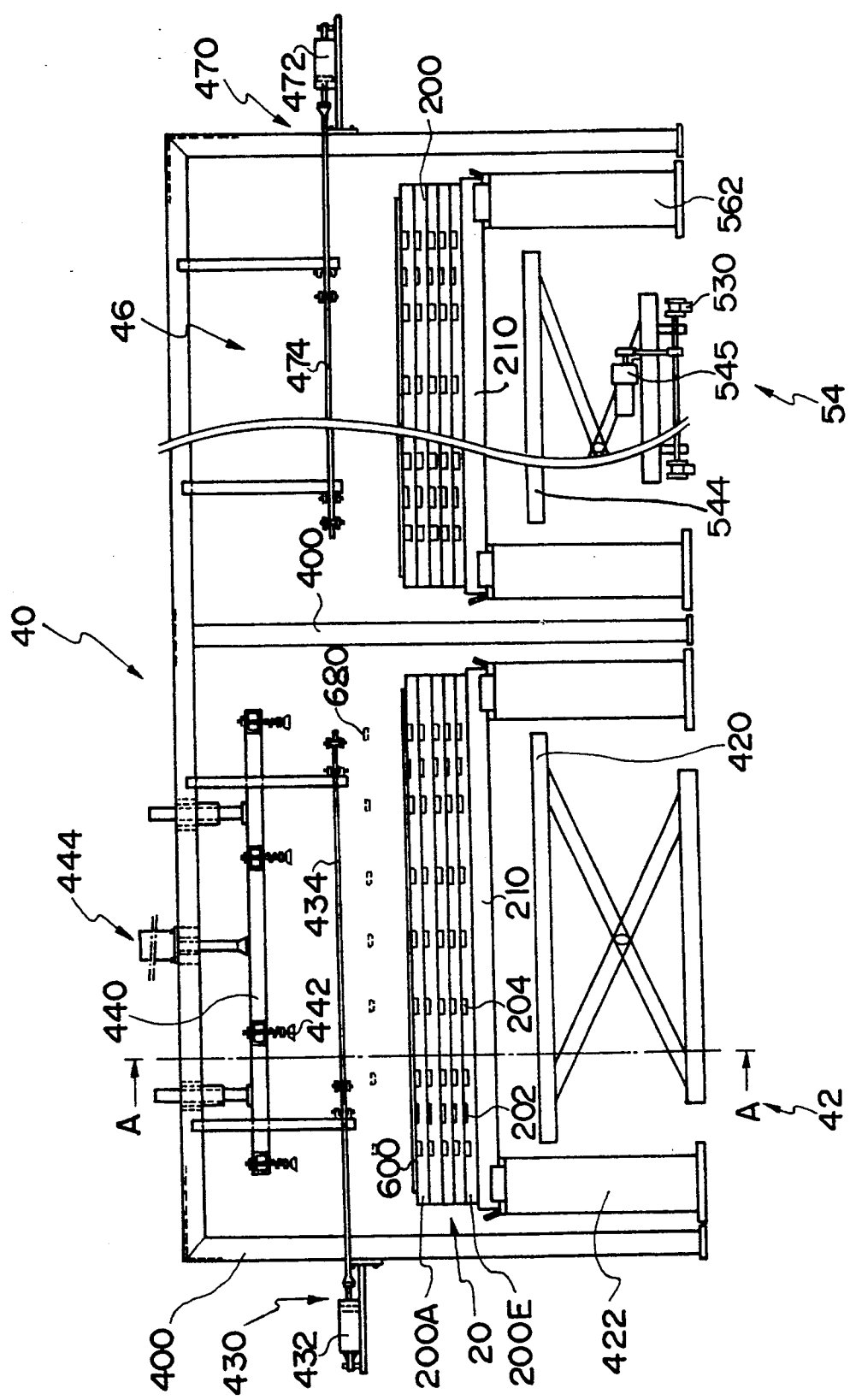
FIG. 28 is a side view of the separation station.
Figure 29:
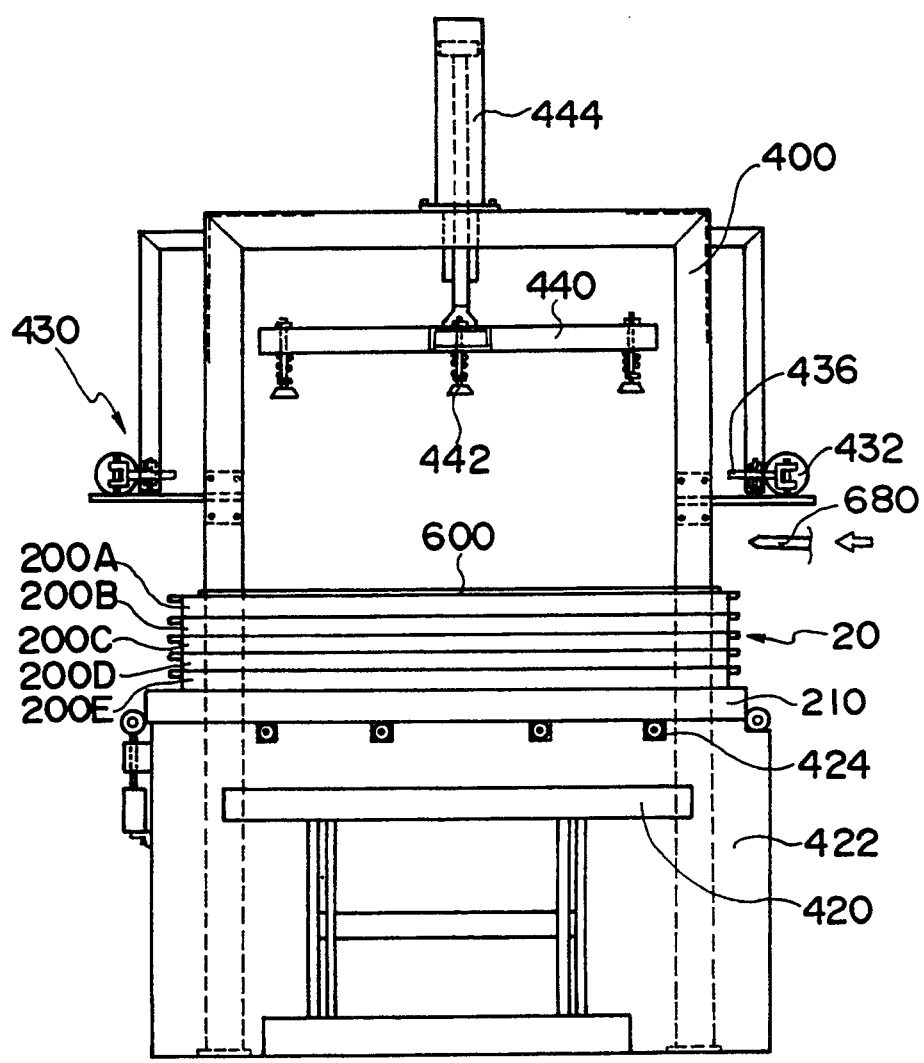
FIG. 29 is a front view of the separation station.
Figure 30:
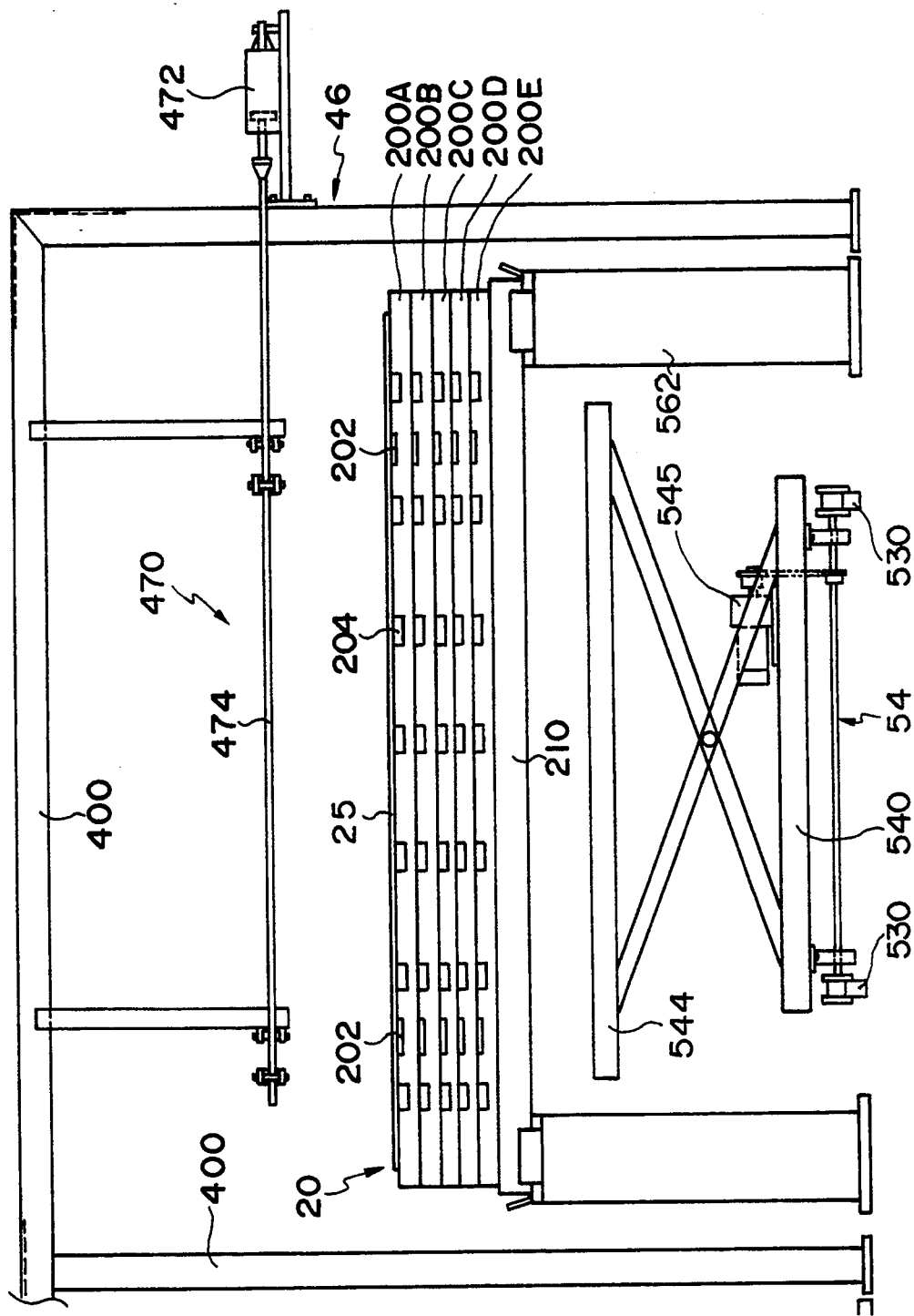
FIG. 30 is a detailed side view of the separation station.

FIG. 27 is a plan view of the separation station, FIG. 28 is a front view, FIG. 29 is a cross-sectional view of FIG. 28 cut at the arrow A—A and FIG. 30 is a front view of the second separator 46.

The separation station 40 is equipped with a first separator 42 and a second separator 46 inside the column-type frame 400. In order to provide the plates to the laser machining device, the first separator 42 is in charge of the operation for making the blank plates or the remaining plates in a condition which enables them to be handled by the first fork 680 of the transfer device. The second separator 46 is in charge of the operation for returning the post-worked plates to the prescribed position.

The first separator 42 is equipped with a stand 422 for supporting at the both side portion thereof the pallet base 210 with multi-pallets 20 loaded and a lifter 420 provided between the stand 422. A roller 424 is equipped on the stand 422. The lifter 420 is provided with an actuator and elevates the pallet base 210.

One pair of pallet gripper device 430 is fixed to the both sides of the column-type frame 400. The pallet gripper device 430 is equipped with an actuator 432 and a rod 434 which moves back and forth by the actuator 432. A pawe 436 which is connected with the rod 434 is also equipped to the pallet gripper device 430.

The lifter 440 which is elevated by the actuator 444 is provided at the upper portion of the frame 400. A number of vacuum pads 442 are fixed to the lifter 440.

The first separator 42 is constructed as follows. This is a case where a multi-pallet 20 consisting of five pallets 220A, 200B, 200C, 200D and 200E is provided from the stacker crane 30 to the stand 422 while piled on the pallet base 210.

The roller 424 is used when transferring the multi-pallet 20 from the stacker crane 30 to the stand 422.

Each pallet 200 has a hole 204 where the first fork 680 of the transfer device 60 is inserted as well as a projection 202 which engages with the pawe 436 of the pallet gripper device 430. In order to pull out the plate 25 stored in the uppermost pallet 200A, the lifter 420 is elevated to face the hole 204 of the pallet 200A to the fork 680 of the transfer device 60. At this point, the plate 25 could be taken out by inserting the fork 680 to the hole 204 of the pallet 200A.

In order to pull out the plate 25 stored inside the third pallet 200C, the lifter 420 is elevated to face the projection 202 of the second pallet 200B to the pawe 436 of the pallet gripper device 430. At this point, the actuator 432 is operated and the pawe 436 is engaged with the projection 202 of the pallet 200B through the rod 434.

Next, by lowering the lifter 420 to face the hole 204 of the third pallet 200C to the fork 680 of the transfer device, the plate inside the pallet 200C is taken out.

By using the station in the providing side as mentioned above, the plates stored in the multi-pallet could freely be taken out.

The second separator 46 has the similar constitution as the first separator 42. The pallet gripper device 470 is equipped with an actuator 472 and a rod 474 which is moved back and forth by the actuator 472. A pawe 476 which is linked to the rod 474 is provided thereto.

The lifter 54 which coacts with the second separator 46 is equipped with a car 540 moving on the rail 530. The car 540 is driven by a motor 545. A lifter 544 is provided movably up-and-down (power source not shown) on the car 540.

The pallet base 210 with multi-pallet 20 loaded is sent on the stand 562 of the second separator 46 by the stacker crane 30. Next, the lifter 544 is elevated to elevate the pallet base 210 and faces the pallet constituting the multi-pallet to the pallet gripper device 470. For example, in the case where the remaining plate is returned to the fourth pallet 200D, the third pallet 200C is faced to the pallet gripper device 470 so that the pawe 476 could support the third pallet 200C and up. By lowering the lifter 544, the fourth pallet 200D becomes the uppermost pallet. Next, the lifter 54 is moved along the axis B2 as shown in FIGS. 23 and 24 to be positioned at the delivery point P1.

The first unloading station 50 is equipped with a carrier 52 which runs on the rail 510 as shown in FIG. 25. The frame 523 of the carrier 52 supports the end portion of the fork 526. As shown in FIG. 24, the fork 526 of the carrier 52 is fixed at the position not interfering with the fork 682 of the transfer device 60 and receives the post-worked plate 25 from the fork 682 of the transfer device 60.

The carrier after receiving the plate 25 moves in the direction of axis A2 in FIG. 24 and reaches the delivery point P1.

Figure 33:
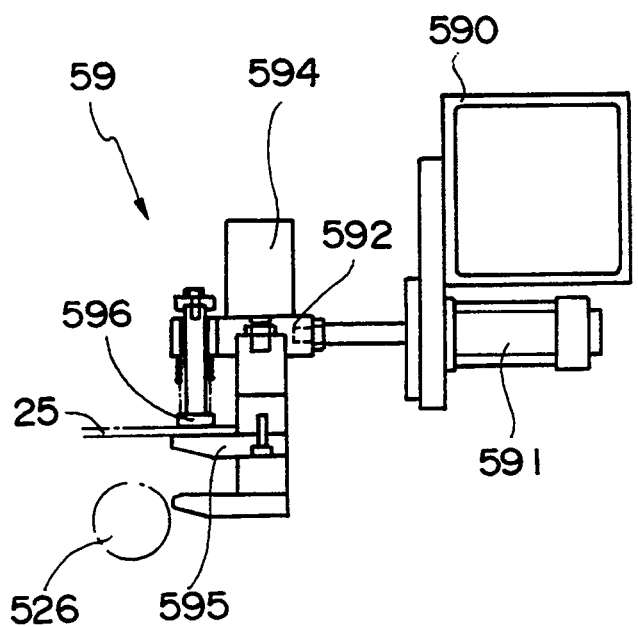
FIG. 33 is a side view of the work gripper device.

The plate work clamp 59 is provided at the delivery point. FIG. 33 shows the detail of the work clamp 59.

The work clamp 59 is equipped with a cylinder 591 fixed to the frame 590. A bracket 592 is fixed to the tip of the piston rod. The bracket 592 is equipped with a gripper 595 operated by the actuator 594 and which grips the edge portion of the plate 25 on the fork 526 by cooperating with facing press spring 596.

The work clamp 59 grips the plate 25 at the delivery point P1. At this point, carrier 52 returns to the original position. This causes the plate to fall from the fork 526 of the carrier 52 onto the uppermost pallet 220D on the lifter 54. The plate 25 is placed on top of the pallet 200D by releasing the work clamp 59. The lifter 54 is returned to the second separator 46. The lifter 544 is elevated and the pallet reconstructs the multi-pallet 20 by layering the pallets supported by the pallet gripper device 470 again.

When the blank plates 35 are layered directly on top of the pallet base 210, the vacuum pad 440 is used for pallets transferred to the first separation station 40 to lift the uppermost plate and send it to the fork 680 of the transfer device 60. When returning the blank plate 25 to the pallet side, the plate transferred from the fork 682 of the transfer device to the carrier 52 is moved to the delivery point P1 where it is moved onto the pallet waiting at the lifter 54 using the work clamp 59.

Figure 31:
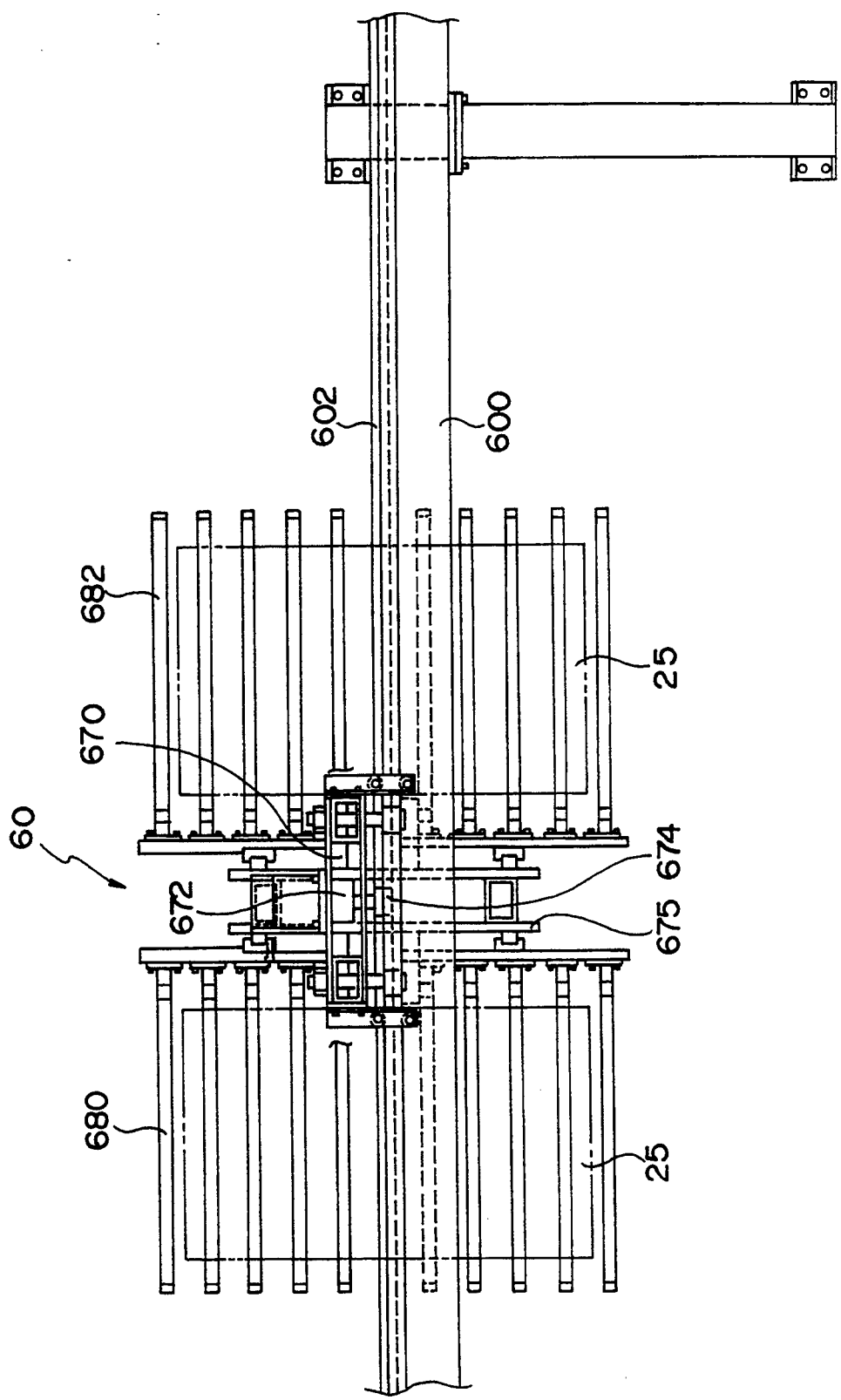
FIG. 31 is a plan view of the work transfer device.
Figure 32:
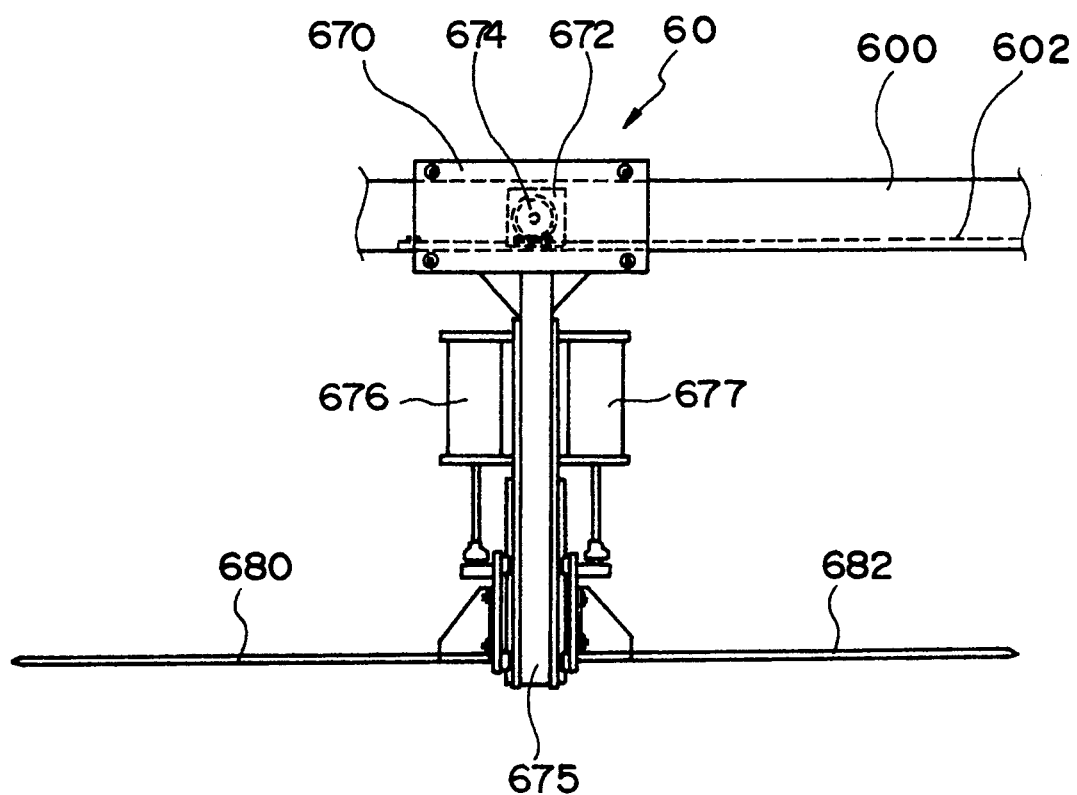
FIG. 32 is a side view of a part of the work transfer device.

FIG. 31 is a plan view showing the transfer device 60 which loads and unloads the plates to the laser machining device, and FIG. 32 is a front view.

The transfer device 60 has a body 670 which runs on the guide rail 600. A pinion 674 provided on the body engage with rack 602 provided on the guide rail 600. By rotating the pinion 674 by the motor 672 the body 670 is moved. The first fork 680 and the second fork 682 are supported elevatably at the both sides of the frame 675 extending downwardly from the body 670. Each fork is moved by the actuator 676, 677.

The first fork 680 takes out the pre-worked plate from the pallet of the first separator 42 and supplies it to the laser machining device. The second fork 682 sends the post-worked plates from the laser machining device to the first unloading station 80 or the second unloading station 50. The work on the second fork 682 is moved onto the fork 526 of the carrier 52 at the second unloading station 50.

FIGS. 34A through 34C current explanatory of the pallet base 210.

The pallet base 210 has a frame 211 which is rectangular at the cross section. A groove 216 for the placement of the multi-pallet is formed on the upper face of the short side of the frame 211. A projection 212 extending outwardly is provided long sides of the frame 211. The projection 212 has a hole 213. The pin 344 of the pallet transfer device of the stacker crane engage with this hole 213.

To the both sides of the frame 211 of the pallet base, a roller 215 for guiding is provided. A roller 217 is provided as necessary at the lower side of the frame 211. The layered blank plates, layered multi-pallets or machined layered works are loaded on the pallet base 210.

FIGS. 35A through 35C are explanatory views of each pallet 200 constructing the multi-pallet.

The pallet 200 has a frame 201 which correspond to the cross sectional shape of the pallet base 210. A projection 207 engaging with the groove 216 of the pallet base 210 is provided on the lower side of the short side of the frame 201 and a groove 206 for receiving the projection of the pallet to be layered on top is provided on the upper side of the short side of the frame 201.

A groove 204 for engaging with the fork of the transfer device is provided at the upper portion of the frame 201. A number of stoppers 205 are provided on the upper surface thereof. The pitch of the groove 204 correspond to the pitch of the fork and the stopper 205 positions the stored plates.

The pallet 200 constructed as mentioned above could construct the multi-pallet by layering pallets 200 which stores the blank plates or remained plates on top of each other.

Also it could be made so that, for example, a thin base made of honeycomb structure could be used in the place of the above-mentioned pallets. In this case, the plates are placed on the thin base made of honeycomb structure and the plates on the base is machined by supplying the plates to the laser machining device along with the base. When doing so, the machined work is supported on the base so that the joint for temporarily connecting the product and the remaining plate is not needed.

The present system could handle securely the remaining plates having different shapes and the like because it has the ability of scooping up the plates inside the pallets with the separation station for separating the object pallet from the layered multi-pallets and the transfer device with two forks, as mentioned above.

The separation station is also equipped with a lifter with vacuum pads. Therefore it could easily handle plates layered directly on the pallets.

The non-magnetic work such as plastic and ceramic and the like could be handled as the magnetic work with the above-mentioned constitution.

Because the transfer device is equipped with two forks moving together where the first fork handle the pre-worked plate and the second fork handle the post-worked plate, the tact time could be shortened.

Figure 36A:
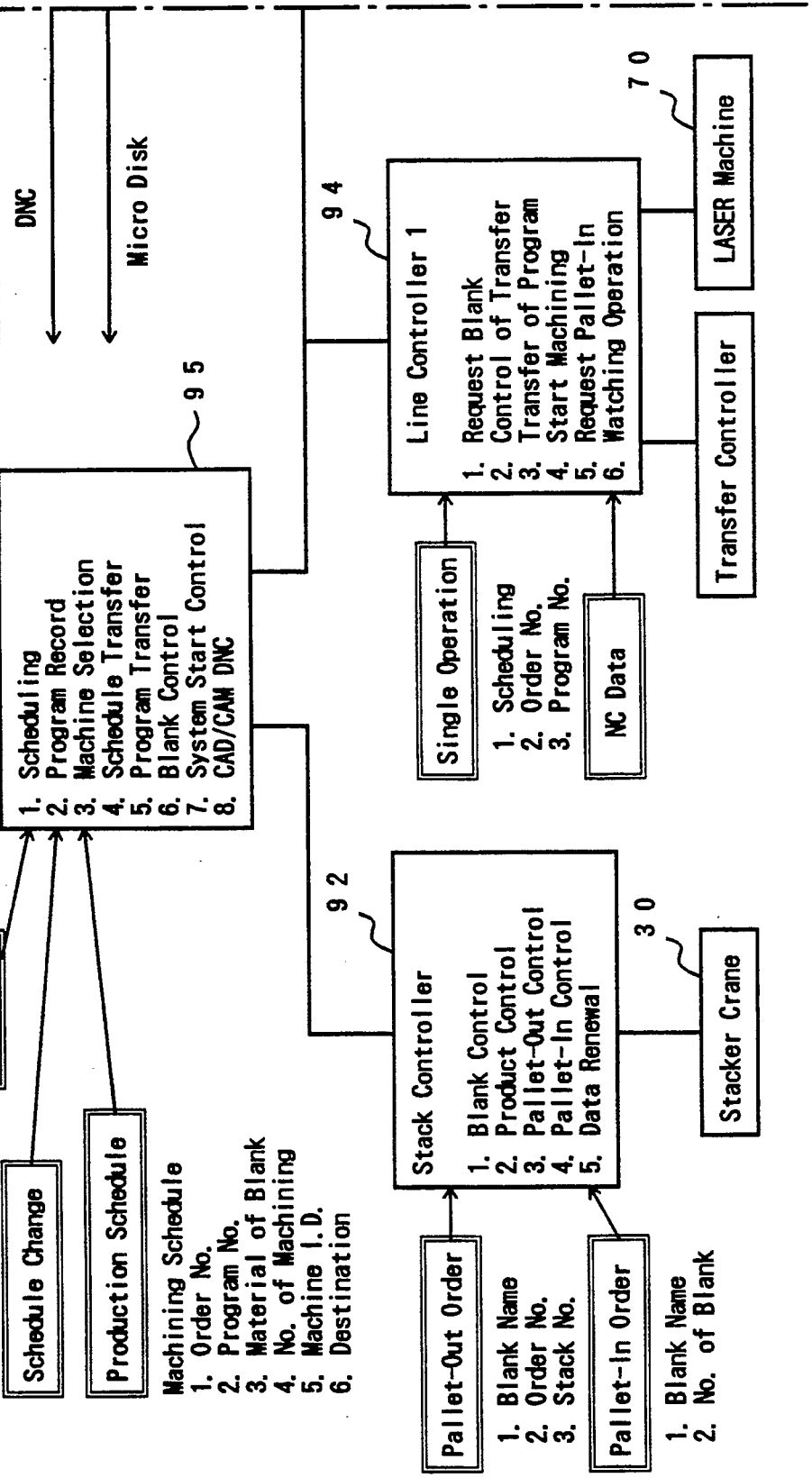
FIG. 36 is a block diagram of the system.
Figure 36B:
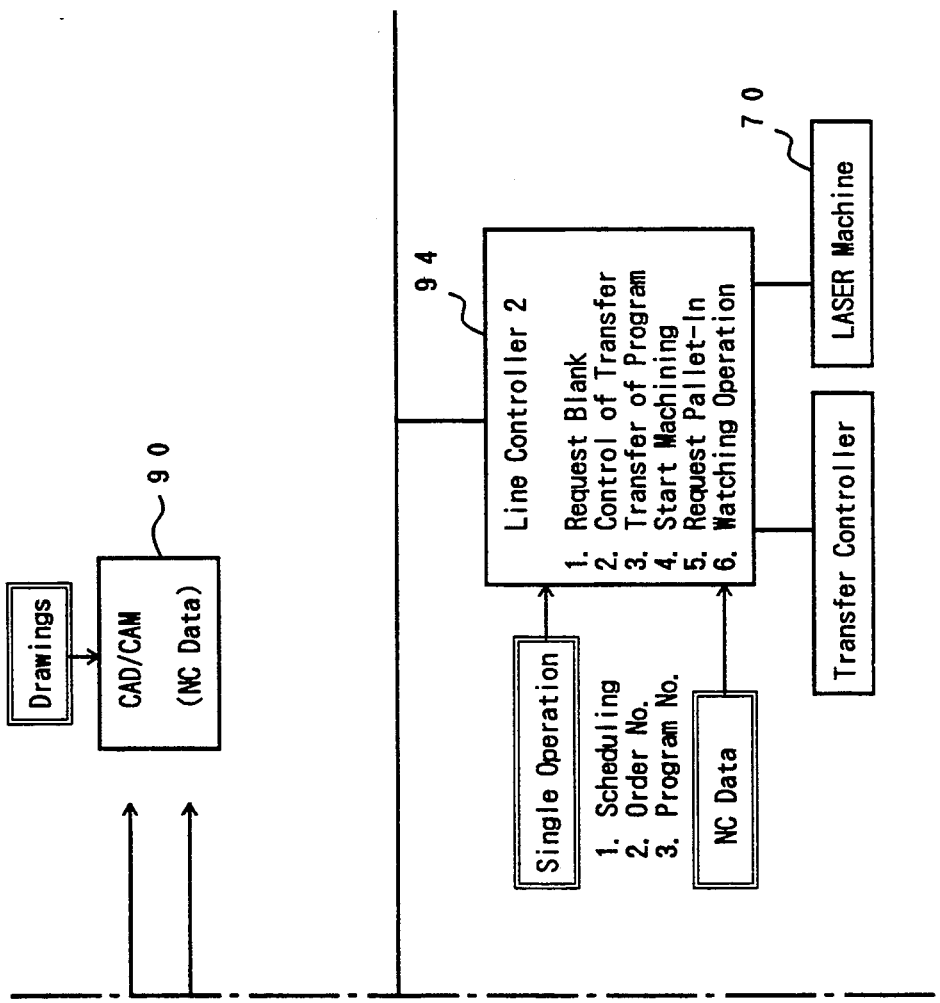

FIGS. 36A and 36B show the constitution of the controller.

The system as a whole is controlled by the management controller 95. The management controller has function such as scheduling and program recording, selection of the machine, transferring of schedule, transferring of program, checking the stock in the stack, ordering the starting of operation, controlling CAD/-CAM and DNC.

The management controller 95 is provided with a data of the production plan. At the same time, the management controller 95 is provided with a data of the stock through a stack yard controller 92. Therefore it could confirm, for example, how many plates of SPHC of 2.3 mm is left. The production plan, that is the machining schedule is made of a program No., material, number of machining, machining laser No., order name for ordering the destination of the product (hereinafter referred to an order number). Also it is given with a change in plan after inputting the production plan. The machining program necessary for laser machining is produced at the CAD/CAM (computer aided design-/computer aided manufacturing system) 90 which is connected by DNC (direct numerical control system) to the management controller 95.

The management controller 95 gives orders according to the schedule to the line controller 94.

The stack yard controller 92 has functions such as material stock managing, product managing, output operation, input operation, data renewal and the like and controls the stacker crane 30. The material stock managing here means that when a stack number is inputted, the name of the material, the quality of the material and the number of material is controlled as the stack data. Also, the production managing means that when a stack number is inputted as mentioned above, the name of the work, the quality of the material, the number of the material, the name of the client and the like could be controlled. Therefore, the stack yard controller 92 is equipped with output order ordered by one of the data such as the name of the material for manual input/output operation, order number and the stack number showing the place of the stack, and input order giving data of the name of the material, the number of the material, restoring and emptied input. The stack yard controller gives operation order to the stacker crane 30 based on the demand from the line controller 94 and transfers the ordered pallet.

The line controller 94 gives order to the laser machining device 70 and the transfer device based on the forwarded machining schedule. The line controller 94 has the functions such as demand of material to the stocker, forwarding of transfer device control program, order to begin machining, demand for pallet input and the confirming of operation. That is, the line controller 94 demands the material such as SPHC 2.3 and the like to the stack yard controller 92 based on the data input by the machining schedule, orders the transfer device to supply the material to the laser machining device 70 and the like. At the same time, the line controller 94 forwards the machining program to the laser machining device 70 and gives order to start machining of the laser machining device 70. Next, it demands pallet input for returning the machined work. Also it could confirm the operation of the laser machining device 70 by the line controller 94.

Next, the flow for handling the plates inside the multi-pallets with this laser machining system will be explained.

Figure 37:
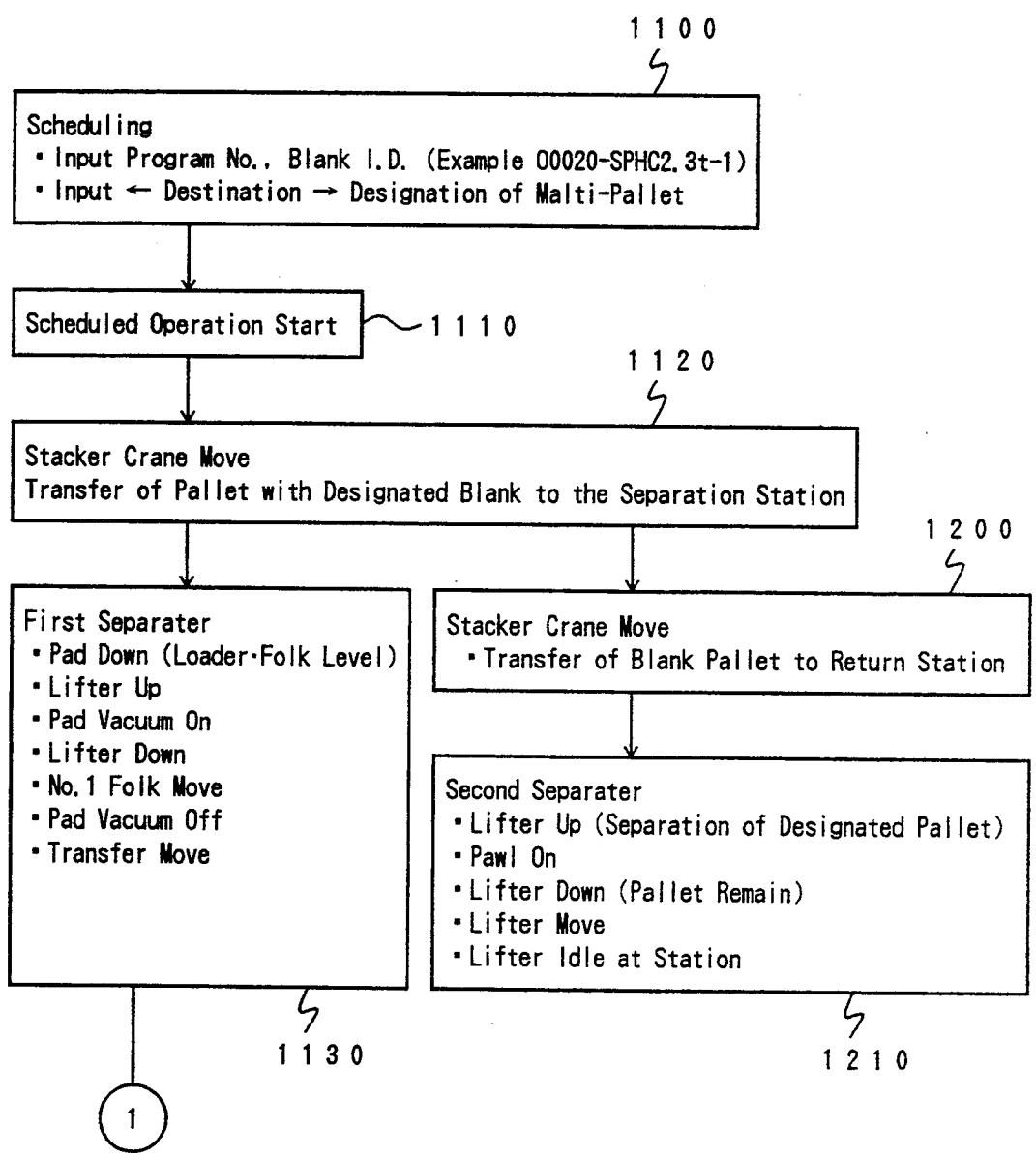
FIG. 37 is a flow chart of the system.
Figure 38:
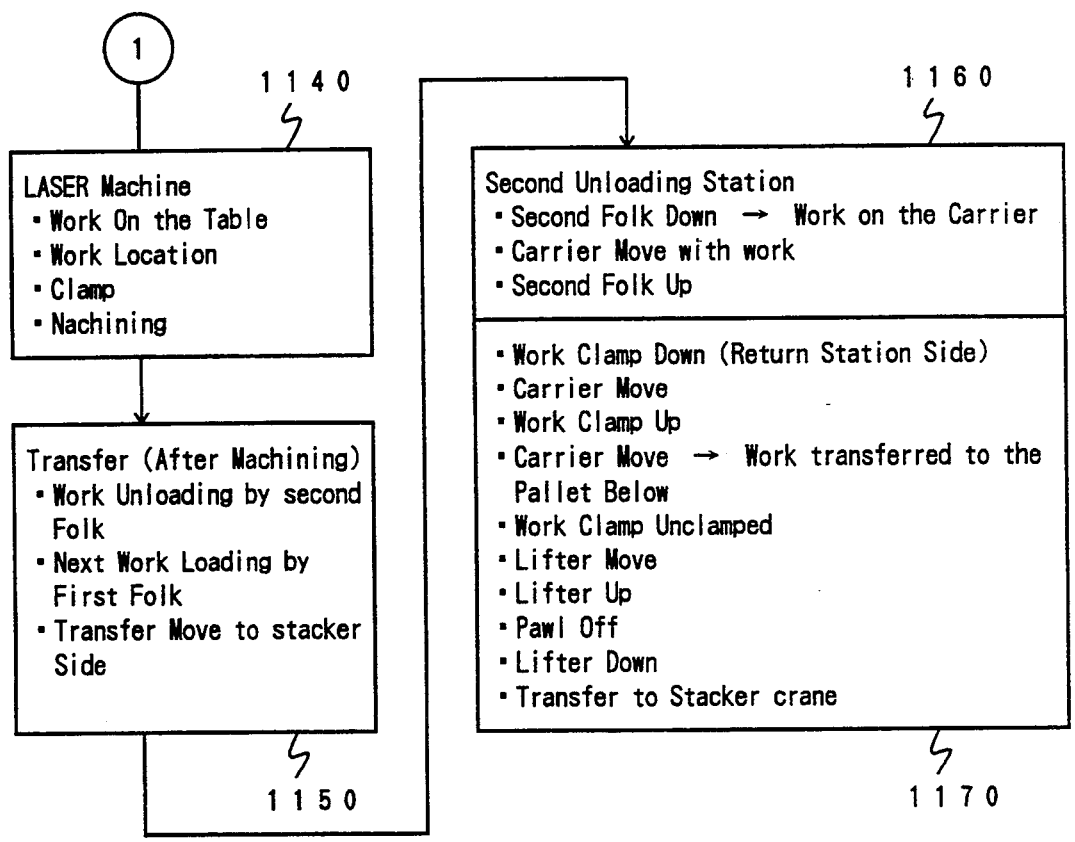
FIG. 38 is a flow chart of the system.

FIGS. 37 and 38 shows the case where blank pre-worked plate is being machined.

The machining schedule is made at step 1100. There, the machining program number of work and the number of machined work are appointed along with the intention of returning the remained plates after machining (post-worked plate) to the multi-pallet. In returning the remained plates, the empty multi-pallet is designated and taken out according to the priority and the designated machining program number is given to the empty pallet. Next, the order to begin the schedule is given at step 1110.

The stacker crane 30 moves and transfers the pallet 210 with designated work loaded to the first separator 42 of the separation station 40 in step 1120.

Step 1130 shows the operation of the first separator 42. The vacuum pad 442 of the first separator 42 lowers to the adhesion position. Then the lifter 420 with the pallet 210 placed lifts and the vacuum pad adheres the work 25 on the pallet 210. As the lifter 420 lowers the first fork 680 of the transfer device 60 is inserted underneath the work and turns the adhesion off. The transfer device 60 with work placed on the fork moves to the laser machining device 70.

Step 1140 shows the operation on the laser machining device 70. The first fork 680 of the transfer device 60 places the work 25 on the table of the laser machining device 70. The work on the table is clamped and machined.

In step 1150, the work 25 with machining done is taken away from the table with the second fork 682 of the transfer device 60. At the same time, the work held in the first fork 680 of the transfer device 60 is placed on the table.

Steps 1160 and 1170 shows the return movement of work from the first unloading station 50 to the second separator 46.

At the first unloading station 50, the work 25 is moved from the second fork 682 of the transfer device 60 onto the fork 526 of the carrier 52. The carrier 52 with work 25 placed runs to the delivery point P1.

The work clamp grips the work on the carrier and carrier returns. The work gripped by the work clamp falls to the designated empty pallet placed on the lifter. The clamp is freed and the lifter is returned to the second separator. At the second separator, the multi-pallet is reconstructed by cooperating with the pallet gripper device and the multi-pallet is returned to the stack yard by the stacker crane.

Figure 39:
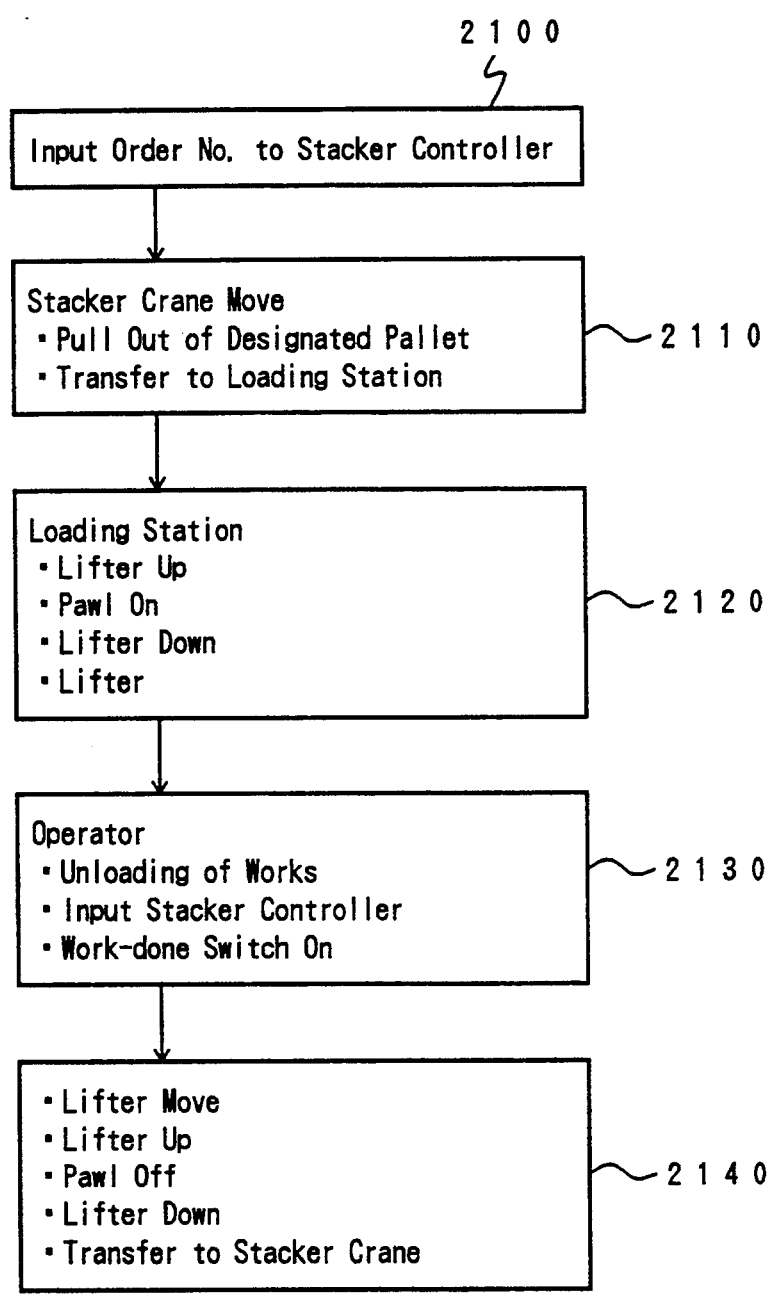
FIG. 39 is a flow chart of the system.

FIG. 39 shows the operation for taking out the work inside the pallet or setting the work on the pallet by sending the pallet of the multi-pallet to the loading station.

Step 2100 inputs the order number (program number) to the stack yard controller and summons the pallet. The multi-pallet including the designated pallet is sent by the stacker crane to the loading station in step 2110. Step 2120 shows the operation of the loading station and the pallet gripper device and the lifter cooperates and takes out the designated pallet from the multi-pallet.

Step 2130 shows the operation of the operator and takes out the work in the pallet or sets the work in the pallet. The operator inputs the data to the stack yard controller and turns the operation finish switch on.

The lifter and the pallet gripper device cooperates and returns the designated pallet to the multi-pallet and returns the multi-pallet to the stack yard by the stacker crane in step 2140.

Figure 40:
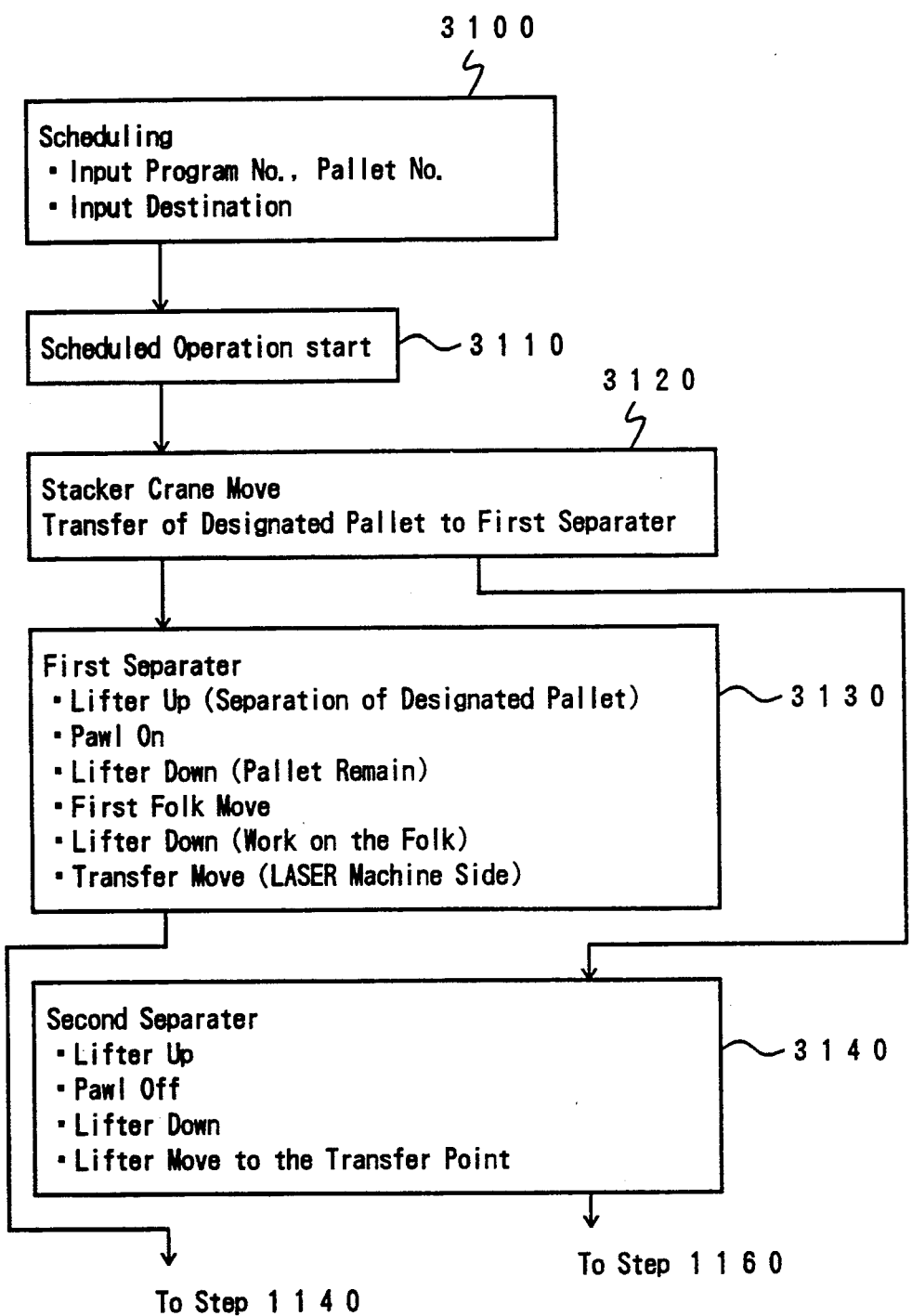
FIG. 40 is a flow chart of the system.

FIG. 40 shows the case where work inside the multi-pallet is used for machining.

The schedule is made in step 3100. The program number, the name of the pallet with the work (order number which is the program number) is inputted thereto. The pallet for returning the machined work is designated according to the priority after searching the stack data by the stack yard controller and is taken out. At the same time, the pallet is given an order number, that is, the program number. The schedule operation started in step 3110.

The stacker crane is moved in step 3120 and the designated multi-pallet is sent to the first separator of the separation station.

Step 3130 shows the movement of the first separator. The designated pallet is separated from the multi-pallet and the work inside the pallet is sent to the laser machining device by the transfer device. Next, it moves onto the step 1140 of FIG. 38.

Step 3140 shows the movement of the second separator. The lifter cooperates with the pallet gripper device and runs to the delivery point with the designated pallet as the uppermost pallet in the multi-pallet and waits there. Next it moves onto step 1160.

With treatments mentioned above, the automated manufacturing of products using blank plates and recycled remaining plates could be carried out effectively.

We claim:

1. A laser machining system comprising:
   a laser machine for working a plate;
   a stack yard for storing pallets;
   a stacker crane for transferring pallets;
   a loading station for loading a pre-worked plate from a pallet to the laser machine;
   a returning means for returning a post-worked plate from the laser machine to a pallet; and
   a transfer device having a pair of holders for transferring pre-worked and post-worked plates between said loading station, said laser machine, and said returning means.

2. The laser machining system claimed in claim 1, further comprising:
   an unloading station for delivering a post-worked plate transferred from said laser machine to said returning means.

3. The laser machining system claimed in claim 1, wherein said returning means comprises:
   a carrier which receives a post-worked plate at said unloading station and moves said post-worked plate to a delivery point,
   a clamp device provided at the delivery point for holding said post-worked plate, and
   a moving lifter which receives said post-worked plate at said delivery point on a pallet and returns said pallet to said stacker crane.

4. The laser machining system claimed in claim 1, further comprising:
   an unloading station for delivering said post-worked plate transferred from said laser machine to a next working step.

5. The laser machining system claimed in claim 1, wherein said transfer device comprises:
   a guide rail,
   a frame movable on said guide rail,
   a holder for holding said pre-worked plate, and
   a fork type holder for holding said post-worked plate.

6. The laser machining system claimed in claim 1, wherein said stacker crane comprises:
   a rail,
   a frame movable on said rail,
   a pair of posts standing on said frame,
   a carriage slidably supported by said posts, and
   a pallet handling device.

7. A laser machining system comprising:
   a laser machine for working a plate;
   a stack yard for storing pallets;
   a multi-pallet stored in said stack yard which includes a plurality of pallet components for carrying plates on each pallet component;
   a stacker crane for transferring pallets;
   a separation station which separates a designated pallet from said multi-pallet; and
   a transfer device having a pair of holders for transferring a pre-worked plate and a post-worked plate between said separation station and said laser machine.

8. The laser machining system claimed in claim 7, wherein said transfer device comprises:
   a guide rail,
   a frame movable on said guide rail,
   a pair of fork type holders provided back to back for holding pre-worked and post-worked plates.

9. The laser machining system claimed in claim 8, wherein said fork type holder is independently lifted by said frame.

10. The laser machining system claimed in claim 7, wherein said separation station further comprises:
    a second separator which separates a designated pallet from said multi-pallet for receiving a post-worked plate transferred from said laser machine.

11. The laser machining system claimed in claim 7, wherein said multi-pallet comprises:
    a pallet base wherein pallet components are stacked on said pallet base, each of said pallet components being positioned at a predetermined height by supporting means.

12. The laser machining system claimed in claim 7, further comprising an unloading station for delivering a post-worked plate transferred from said laser machine to a next working step.

13. The laser machining system claimed in claim 7, further comprising an unloading station for delivering said post-worked plate transferred from said laser machine to said separation station.

14. The laser machining system claimed in claim 7, further comprising a returning means for returning a post-worked plate from said laser machine to a pallet on said separation station.

15. The laser machining system claimed in claim 14, wherein said returning means comprises:
 a carrier which receives a post-worked plate at said unloading station and moves said plate to a delivery point,
 a clamp device provided at said delivery point for holding said post-worked plate, and
 a movable lifter which receives said post-worked plate on said pallet at said delivery point and returns said pallet to said multi-pallet.

16. A laser machining system comprising:
 stack yard means for storing both pre-worked and post-worked plates;
 a laser machine for working plates from said stack yard means; and
 a transfer device having a pair of holders for transferring pre-worked plates and post-worked plates between said stack yard means and said laser machine, said transfer device being adapted to return post-worked plates to said stack yard means.

17. The laser machining system claimed in claim 16 further comprising:
 a loading station for loading a pre-worked plate from said transfer device to said laser machine; and
 a returning means for returning a post-worked plate from said laser machine to said transfer device.

18. The laser machining system claimed in claim 17, wherein said returning means comprises:
 a carrier which receives a post-worked plate at said unloading station and moves said post-worked plate to a delivery point;
 a clamp device provided at said delivery point for holding said post-worked plate; and
 a movable lifter which receives said post-worked plate at said delivery point on a pallet supported thereon and returns said pallet to said transfer device.

19. A laser machining system comprising:
 stack yard means for storing both pre-worked plates and post-worked plates;
 a station located beside said stack yard means;
 a first transfer device provided between said stack yard means and said station;
 a laser machine for working plates; and
 a second transfer device provided between said station and said laser machine for returning post-worked plates to said stack yard means.

20. A laser machining system comprising:
 stack yard means for storing a plurality of pallets, each pallet being adapted to store at least one of a pre-worked plate and a post-worked plate;
 a station located beside said stack yard means;
 a first transfer device provided between said stack yard means and said station;
 a laser machine for working plates; and
 a second transfer device provided between said station and said laser machine for returning post-worked plates to said stack yard means.

21. The laser machining system claimed in claim 20 further comprising:
 a separate station for separating a designated pallet from pallets within a group of pallets.

22. The laser machining system claimed in claim 19, wherein:
 said second transfer device comprises a guide rail, a frame movable on said guide rail, and a pair of fork type holders provided back to back for holding at least one of a pre-worked plate and a post-worked plate.

23. The laser machining system claimed in claim 22, wherein:
 said fork type holder is independently liftable by said frame.

24. The laser machining system claimed in claim 21, wherein said separation station comprises:
 a first separator which separates a designated pallet from pallets within a group of pallets; and
 a second separator which separates a designated pallet from said group of pallets for receiving a post-worked plate transferred from said laser machine.

25. The laser machining system claimed in claim 21, further comprising:
 a returning means for returning a post-worked plate from said laser machine to a pallet on said separation station.

26. The laser machining system claimed in claim 25, wherein said returning means comprises:
 a carrier which receives said post-worked plate at an unloading station and moves said post-worked plate to a delivery point;
 a clamp device provided at said delivery point for holding said post-worked plate; and

* * * * *